United States Patent
Lee et al.

(10) Patent No.: US 11,004,447 B2
(45) Date of Patent: May 11, 2021

(54) SPEECH PROCESSING APPARATUS, VEHICLE HAVING THE SPEECH PROCESSING APPARATUS, AND SPEECH PROCESSING METHOD

(71) Applicants: HYUNDAI MOTOR COMPANY, Seoul (KR); KIA MOTORS CORPORATION, Seoul (KR)

(72) Inventors: Jin Ho Lee, Suwon-si (KR); Jae Min Joh, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 91 days.

(21) Appl. No.: 15/649,359

(22) Filed: Jul. 13, 2017

(65) Prior Publication Data

US 2018/0182391 A1 Jun. 28, 2018

(30) Foreign Application Priority Data

Dec. 26, 2016 (KR) .......................... 10-2016-0178871

(51) Int. Cl.
| | |
|---|---|
| *G10L 15/22* | (2006.01) |
| *G10L 15/06* | (2013.01) |
| *G10L 15/30* | (2013.01) |
| *G10L 15/00* | (2013.01) |
| *G06N 5/02* | (2006.01) |
| *G06F 40/30* | (2020.01) |

(52) U.S. Cl.
CPC .............. *G10L 15/22* (2013.01); *G06F 40/30* (2020.01); *G06N 5/02* (2013.01); *G10L 15/005* (2013.01); *G10L 15/063* (2013.01); *G10L 15/30* (2013.01); *G10L 2015/0635* (2013.01); *G10L 2015/223* (2013.01)

(58) Field of Classification Search
CPC ................ G06Q 50/01; G06Q 30/0269; G06F 17/30867; G10L 15/183; G10L 15/22; G10L 2015/088
See application file for complete search history.

(56) References Cited

U.S. PATENT DOCUMENTS

| | | | |
|---|---|---|---|
| 8,577,671 B1 * | 11/2013 | Barve | G06F 17/21 704/9 |
| 9,536,228 B2 * | 1/2017 | Vernon | H04L 67/306 |
| 2007/0011236 A1 * | 1/2007 | Ravula | G06Q 30/02 709/204 |
| 2009/0143052 A1 * | 6/2009 | Bates | G06F 17/30575 455/414.2 |

(Continued)

*Primary Examiner* — Mark Villena
(74) *Attorney, Agent, or Firm* — Morgan, Lewis & Bockius LLP

(57) ABSTRACT

A speech processing apparatus includes a speech processor for acquiring information on a relationship between a first user and a second user on the basis of a spoken language of the first user, a storage for storing a first user database (DB) that includes personal information of the second user identified by a second identification tag and a second user DB that includes personal information of the first user identified by a first identification tag, and a DB managing processor for updating the first user DB and the second user DB based on the acquired information on the relationship between the first user and the second user.

17 Claims, 20 Drawing Sheets

(56) References Cited

U.S. PATENT DOCUMENTS

| | | | |
|---|---|---|---|
| 2013/0341390 A1* | 12/2013 | Vellozo Luz | G06F 17/30879 |
| | | | 235/375 |
| 2014/0279626 A1* | 9/2014 | Joo | G06Q 50/01 |
| | | | 705/319 |
| 2015/0186406 A1* | 7/2015 | Nadimi | G06Q 50/01 |
| | | | 707/610 |
| 2016/0037331 A1* | 2/2016 | Vernon | H04L 67/306 |
| | | | 455/414.1 |
| 2016/0210963 A1* | 7/2016 | Kim | G10L 15/1822 |
| 2017/0024375 A1* | 1/2017 | Hakkani-Tur | G06F 17/2785 |
| 2017/0034176 A1* | 2/2017 | Qi | H04W 4/21 |
| 2017/0061005 A1* | 3/2017 | Purcell | G06F 17/30864 |
| 2017/0068512 A1* | 3/2017 | Cho | G10L 25/48 |
| 2017/0085658 A1* | 3/2017 | Todd | H04L 67/22 |
| 2017/0091532 A1* | 3/2017 | Son | G06K 9/00268 |
| 2017/0161684 A1* | 6/2017 | Chen | G06Q 10/00 |
| 2018/0096072 A1* | 4/2018 | He | G06F 3/0481 |

* cited by examiner

SPEECH PROCESSING APPARATUS, VEHICLE HAVING THE SPEECH PROCESSING APPARATUS, AND SPEECH PROCESSING METHOD

CROSS-REFERENCE TO RELATED APPLICATION

This application claims the benefit of priority to Korean Patent Application No. 10-2016-0178871, filed on Dec. 26, 2016 with the Korean Intellectual Property Office, the disclosure of which is incorporated herein by reference.

TECHNICAL FIELD

The present disclosure relates to a speech processing apparatus that recognizes a user's speech and acquires required information from the recognized speech, a vehicle having the speech processing apparatus, and a speech processing method.

BACKGROUND

With the development of vehicle related technologies, various functions for increasing user convenience are being developed and deployed alongside basic driving functionality. For example, functions such as making a call or sending a message may be provided by a vehicle connected to a mobile terminal of a user.

In this way, as functions performable by a vehicle are diversified, a manipulation load of a user increases. The increase in manipulation load may decrease a level of user concentration on driving, which may lead to adverse driving situations. Also, a user who is unskilled in manipulating a device may be unable to properly utilize vehicle functions.

Consequently, there is a need for research and development of a user interface able to decrease a manipulation load. Particularly, a manipulation load of a user is expected to be decreased when speech recognition technology, in which speech of the user is recognized and a function corresponding to the speech of the user is performed, is employed in a vehicle.

SUMMARY

It is an aspect of the present disclosure to provide a speech processing apparatus capable of determining a relationship between a plurality of users on the basis of spoken language of the users, and performing more intelligent speech recognition on the basis of the determined relationship between the users or proactively providing information required by the users.

In accordance with one aspect of the present disclosure, a speech processing apparatus comprises: a speech processor configured to acquire information on a relationship between a first user and a second user on the basis of a spoken language of the first user; a storage configured to store a first user database (DB) that includes personal information of the second user identified by a second identification tag and a second user DB that includes personal information of the first user identified by a first identification tag; and a DB managing processor configured to update the first user DB and the second user DB based on the acquired information on the relationship between the first user and the second user.

The personal information includes at least one of a phone number and an address.

The first identification tag includes a name of the first user; and the second identification tag includes a name of the second user.

The DB managing processor adds a relationship of the second user to the first user to the second identification tag.

The DB managing processor adds a relationship of the first user to the second user to the first identification tag.

The personal information of the first user stored in the second user DB is able to be searched for by the relationship of the first user to the second user.

The speech processor acquires information on a relationship between the second user and another member on the basis of a spoken language of the second user, and the other member is a member of a group to which the first user and the second user belong.

The DB managing processor updates the second user DB on the basis of the acquired information on the relationship between the second user and the other member.

The DB managing processor determines information on a relationship between the first user and the other member based on the acquired information on the relationship between the second user and the other member, and updates the first user DB on the basis of the determined relationship information.

In accordance with another aspect of the present disclosure, a vehicle comprises: a speech processor configured to acquire information on a relationship between a first user and a second user on the basis of a spoken language of the first user; a storage configured to store a first user database (DB) in which personal information of the second user identified by a second identification tag is stored and a second user DB in which personal information of the first user identified by a first identification tag is stored; a DB managing processor configured to update the first user DB and the second user DB based on the acquired information on the relationship between the first user and the second user; and a speaker configured to output speech.

The personal information includes a phone number.

The first identification tag includes a name of the first user; and the second identification tag includes a name of the second user.

The DB managing processor adds a relationship of the second user to the first user to the second identification tag.

The DB managing processor adds a relationship of the first user to the second user to the first identification tag.

The personal information of the first user stored in the second user DB is able to be searched for by the relationship of the first user to the second user.

The first user DB further includes additional information that contains at least one of a birthday and an address of the first user.

The DB managing processor updates the second user DB based on the additional information contained in the first user DB.

The speaker outputs speech for providing a service to the second user on the basis of the additional information.

The vehicle further comprises a communicator configured to communicate with mobile devices of the first user and the second user and download phone book data from the mobile devices, and the DB managing processor uses the downloaded phone book data to generate the first user DB and the second user DB.

In accordance with another aspect of the present disclosure, a speech processing method comprise: storing a first user database (DB) that contains personal information of a second user identified by a second identification tag; acquiring information on a relationship between a first user and the second user on the basis of a spoken language of the first user; updating the first user DB on the basis of the acquired information on the relationship between the first user and the second user; storing a second user DB that contains personal information of the first user identified by a first identification tag; and updating the second user DB on the basis of the acquired information on the relationship between the first user and the second user.

The personal information includes at least one of a phone number and an address.

The first identification tag includes a name of the first user; and the second identification tag includes a name of the second user.

The updating of the first user DB includes adding a relationship of the second user to the first user to the second identification tag.

The updating of the second user DB includes adding a relationship of the first user to the second user to the first identification tag.

The speech processing method further comprises acquiring information on a relationship between the second user and another member on the basis of a spoken language of the second user, and the other member is a member of a group to which the first user and the second user belong.

The speech processing method further comprises updating the second user DB on the basis of the acquired information on the relationship between the second user and the other member.

The speech processing method further comprises determining information on a relationship between the first user and the other member on the basis of the acquired information on the relationship between the second user and the other member; and updating the first user DB on the basis of the determined relationship information.

DETAILED DESCRIPTION

Figure 1:
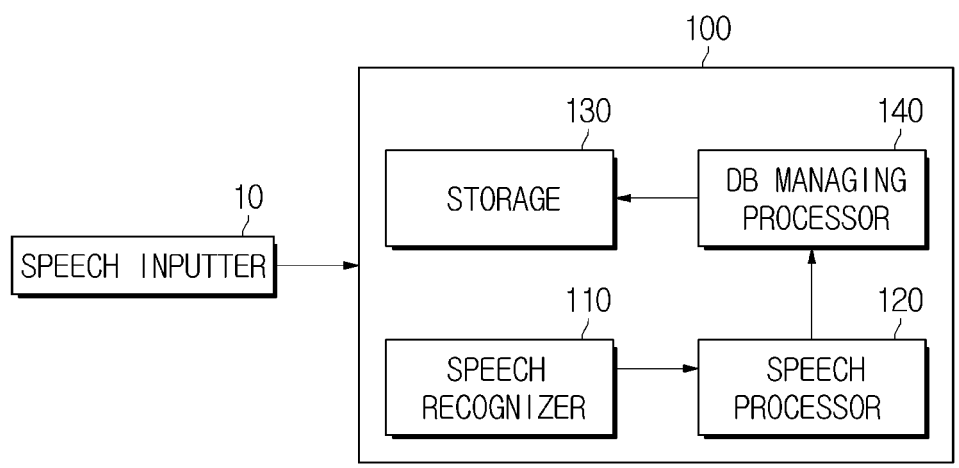
FIG. 1 is a control block diagram of a speech processing apparatus according to exemplary implementations of the present disclosure.

Like reference numerals refer to like elements throughout the specification. Not all details of implementations of the present disclosure are described herein, and description of general art to which the present disclosure pertains or overlapping descriptions between implementations are omitted. Terms, such as "unit," "module," "member," and "block," used herein may be implemented by software or hardware. According to different implementations, a plurality of units, modules, members, and blocks may be implemented by a single element, or each of a single unit, a single module, a single member, and a single block may include a plurality of elements.

Throughout the specification, a certain part being "connected" to another part includes the certain part being directly connected to the other part or being indirectly connected to the other part. Indirect connection includes being connected through a wireless communication network.

Also, a certain part "including" a certain element signifies that the certain part may further include another element instead of excluding the other element unless particularly indicated otherwise.

Terms such as first and second are used to distinguish one element from another element, and correlations such as an order between elements are not limited by the terms.

A singular expression includes a plural expression unless clearly indicated otherwise in context.

A reference numeral is given to each step for convenience of description. The reference numerals are not for describing an order of the steps, and the steps may be performed in an order different from that shown in the drawings unless a specific order is clearly described in the context.

Hereinafter, implementations of a speech processing apparatus, a vehicle having the same, and a speech processing method will be described in detail with reference to the accompanying drawings.

FIG. 1 is a control block diagram of a speech processing apparatus according to exemplary implementations of the present disclosure.

Referring to FIG. 1, a speech processing apparatus 100 according to an exemplary implementation includes a speech recognizer 110 configured to recognize speech of a user input through a speech inputter 10, a storage 130 configured to store information related to the user, a speech processor 120 configured to acquire required information on the basis of the recognized speech, and a database (DB) manager 140 configured to manage the information stored in the storage 130 on the basis of the acquired information.

The speech recognizer 110 recognizes speech input by the user and outputs a result of the recognition. The result of the recognition may include spoken language or words or numerals by the user, and the user's spoken language will be referred to as speech in exemplary implementations that will be described below. The spoken language may be a predetermined command or natural language, which is language ordinarily used by the user.

The speech recognizer 110 may include a speech recognition engine. The speech recognition engine may apply a speech recognition algorithm to input speech, recognize speech by the user, and generate a result of the recognition.

Here, the input speech may be converted into a form that is more useful for speech recognition. A start point and an end point are detected from a speech signal, and an actual speech range included in the input speech is detected. This is referred to as End Point Detection (EPD).

Also, feature vector extracting technology such as Cepstrum, Linear Predictive Coefficient (LPC), Mel-Frequency Cepstral Coefficient (MFCC), and filter bank energy may be applied within the detected range to extract a feature vector of the input speech.

The result of the recognition may be obtained through comparison between an extracted feature vector and a trained reference pattern. For this, an acoustic model in which properties of signals of speech are modeled and compared and a language model in which a linguistic order relationship of words or syllables corresponding to recognized words are modeled may be used.

The acoustic model may be subdivided into a direct comparison method in which a recognition object is set as a feature vector model and the feature vector model is compared with a feature vector of speech data and a statistical model method in which a feature vector of a recognition object is statistically processed and used.

The direct comparison method is a method in which a unit of a word, a phoneme, and the like that has become a recognition object is set as a feature vector model and similarity between the feature vector model and input speech is compared. A vector quantization method is a possible example of the direct comparison method. The vector quantization method is a method in which feature vectors of input speech data are mapped to a codebook, which is a reference model, and coded as representative values, and the coded values are compared with one another.

The statistical model method is a method in which units of a recognition object are configured as state sequences and relations between the state sequences are used. The state sequences may be configured as a plurality of nodes. Methods using relations between state sequences include Dynamic Time Warping (DTW), Hidden Markov Model (HMM), and a method using a neural network.

The DTW is a method in which a difference on a time axis when a feature vector of a speech signal is compared with a reference model is compensated for in consideration of a dynamic property of speech in which a length of a signal varies with time even when the same person says the same thing. The HMM is speech recognition technology in which speech is assumed to be a Markov process having a state transition probability and a node (an output symbol) observation probability at each state, the state transition probability and the node observation probability are estimated through learning data, and a probability of generation of speech input to an estimated model is calculated.

Meanwhile, the language model in which a linguistic order relationship of words, syllables, or the like is modeled may apply an order relationship between a unit that forms language to a unit obtained from speech recognition. In this way, acoustic ambiguity and recognition errors may be reduced. The language model includes a statistical language model and a model based on finite state automata (FSA), and word chain probabilities such as a unigram, a bigram, and a trigram are used for the statistical language model.

The speech recognizer 110 may use any of the methods described above to recognize speech. For example, an acoustic model to which the HMM is applied may be used, or an N-best search method in which an acoustic model and a speech model are integrated may be used. In the N-best search method, up to N recognition result candidates are selected using an acoustic model and a language model, and then a ranking of the candidates is reevaluated. In this way, recognition performance may be improved.

The speech recognizer 110 may calculate a confidence value to ensure a confidence of a recognition result. The confidence value is a measure of how reliable a speech recognition result is. For example, the confidence value may be defined as a relative value related to a probability of a phoneme or a word, which is the recognition result, being spoken from other phonemes or words. Consequently, the confidence value may be expressed as a value between 0 and 1, and may also be expressed as a value between 0 and 100.

The recognition result may be output and an operation corresponding to the recognition result may be performed when the confidence value exceeds a threshold. The recognition result may be rejected when the confidence value thereof is equal to or smaller than a threshold.

The speech recognizer 110 may be implemented within a computer-readable recording medium using software, hardware, or a combination thereof. According to hardware implementation, the speech recognizer 110 may be implemented using one or more electric units such as application specific integrated circuits (ASICs), digital signal processors (DSPs), digital signal processing devices (DSPDs), programmable logic devices (PLDs), field programmable gate arrays (FPGAs), processors, micro-controllers, and microprocessors.

According to software implementations, the speech recognizer 110 may be implemented with a separate software device configured to perform one or more functions or operations, and a software code may be implemented by a software application written in a proper program language.

The speech processor 120 may discover an intention of speech of the user from spoken language. For example, when the spoken language is natural language, the speech processor 120 may apply natural language processing technology and perform a function of a dialog manager.

Also, the speech processor 120 may acquire information on a relationship between a plurality of users from the spoken language. For example, when the plurality of users are in the same family, the speech processor 120 may determine, from the spoken language, whether the plurality of users have a father-daughter relationship, a father-son relationship, a husband-wife relationship, a mother-daughter relationship, or a mother-son relationship.

The speech processor 120 may include one or more memories configured to store a program for performing the above-mentioned operation and operations that will be described below and one or more processors configured to run the stored program.

The speech processor 120 may share a memory and a processor with the speech recognizer 110, and may share a memory with the storage 130. For example, the speech processor 120 may be provided as a single processor together with a DB managing processor 140 and may be physically formed as a single chip. That is, as long as the speech processor 120 and the speech recognizer 110 are able to perform operations described in the exemplary implementations, physical configurations for implementing the speech processor 120 and the speech recognizer 110 are not limited thereto.

The storage 130 may store user related information in a DB form. For example, the storage 130 may store first user information in a first user DB, store second user information in a second user DB and may store third user information in a third user DB.

Here, information on a user may include other people's personal information saved by each user. Other people's personal information may include information such as a phone number and an address. Also, other people may include an acquaintance or a family member other than the user himself or herself.

The first user DB, the second user DB, and the third user DB are all stored in the storage 130. The number of users and the number of DBs, which depends on the number of users, are not limited.

User information stored in each of the user DBs may be updated on the basis of relationship information acquired by the speech processor 120. For example, when the speech processor 120 has acquired a relationship between the first user and the second user, information on the relationship between the first user and the second user may be additionally stored in the first user DB and the second user DB.

For example, the speech processing apparatus 100 may generate a user DB using phone book data from a mobile device of a user in a vehicle and store the user DB. Also, the speech processing apparatus 100 may recognize speech of the user, use information acquired from the recognized speech, and update information stored in the user DB. An exemplary implementation of the speech processing apparatus 100 will be described in detail according to the above example.

Figure 2:
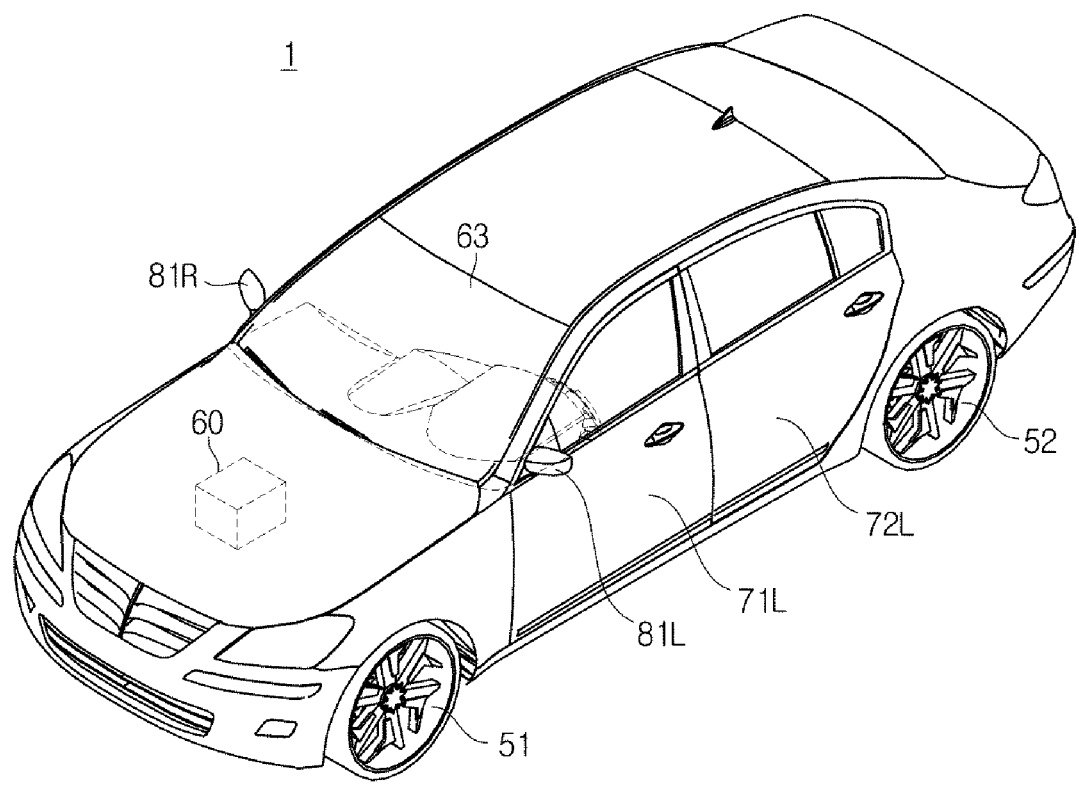
FIG. 2 is a view illustrating an exterior of a vehicle according to exemplary implementations of the present disclosure.
Figure 3:
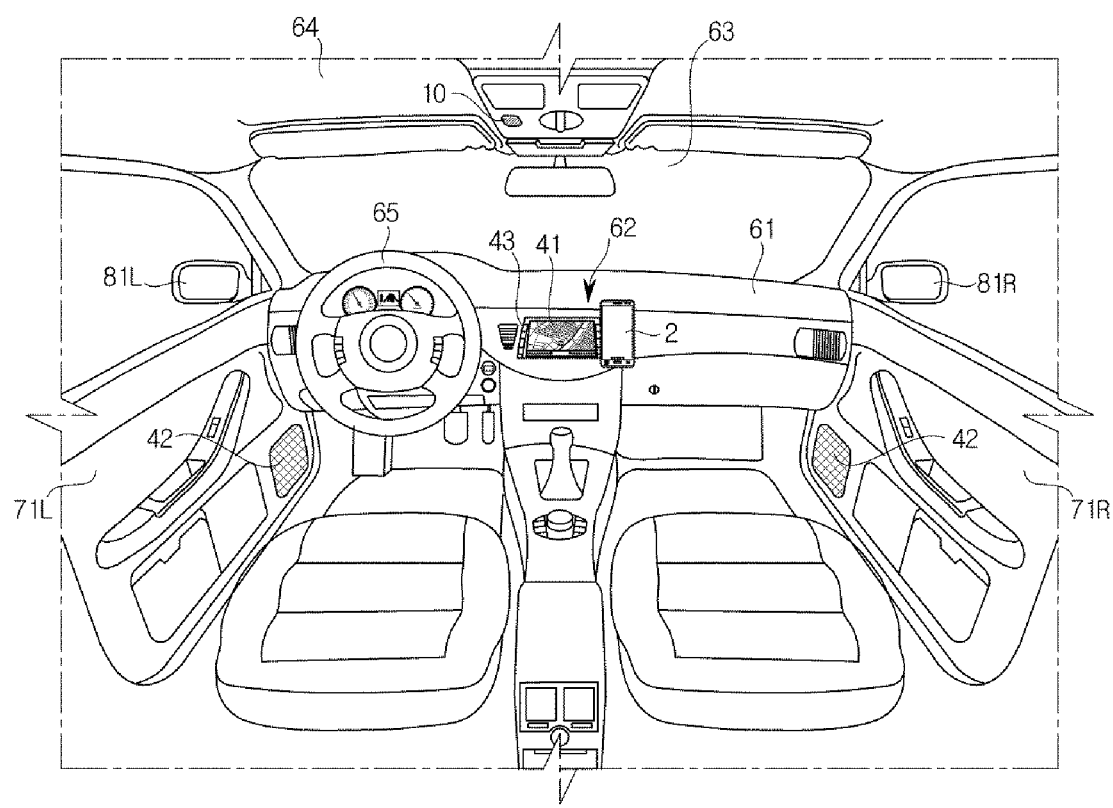
FIG. 3 is a view illustrating a configuration of an interior of the vehicle of FIG. 2.

FIG. 2 is a view illustrating an exterior of a vehicle, and FIG. 3 is a view illustrating a configuration of an interior of the vehicle of FIG. 2.

Referring to FIGS. 2 and 3, a vehicle 1 exemplarily includes vehicle wheels 51 and 52 configured to move the vehicle 1, doors 71L, 71R, 72L, and 72R configured to shield an interior of the vehicle 1 from the outside, a front window 63 configured to provide a driver with a field of view in front of the vehicle 1, and side mirrors 81L and 81R configured to provide the driver with a field of view behind the vehicle 1.

The front window 63 is provided at an upper front side of the vehicle 1 to enable a driver inside the vehicle 1 to acquire visual information in front of the vehicle 1, and is also referred to as windshield glass.

Also, the side mirrors 81L and 81R include a left side mirror 81L provided at a left side of the vehicle 1 and a right side mirror 81R provided at a right side of the vehicle 1, and the side mirrors 81L and 81R enable the driver inside the vehicle 1 to acquire visual information beside and behind the vehicle 1.

The vehicle wheels 51 and 52 include front wheels 51 provided at a front portion of the vehicle and rear wheels 52 provided at a rear portion of the vehicle, and a driving device 60 provided inside the vehicle 1 provides a rotational force to the front wheels 51 or the rear wheels 52 to move the vehicle 1.

The driving device 60 provides the rotational force to the front wheels 51 when the vehicle 1 uses a front-wheel-drive method and provides the rotational force to the rear wheels 52 when the vehicle 1 uses a rear-wheel-drive method. Also, the driving device 60 may provide the rotational force to all of the front wheels 51 and the rear wheels 52 when the vehicle 1 uses a four-wheel-drive method.

The driving device 60 may employ an engine configured to burn a fossil fuel and generate the rotational force or a motor configured to receive power from a condenser and generate the rotational force. The driving device 60 may also employ a hybrid method in which both an engine and a motor are included therein and one of the engine and the motor is selectively used.

The doors 71L, 71R, 72L, and 72R are rotatably provided at the left and right sides of the vehicle 1 to enable a driver or a passenger to ride in the vehicle 1 and to shield the interior of the vehicle 1 from the outside.

Moreover, the vehicle 1 may include a sensing device such as a proximity sensor configured to sense an obstacle or another vehicle behind or beside the vehicle 1 and a rain sensor configured to sense precipitation and an amount of precipitation.

A display 41 configured to display a screen required for performing control of the vehicle including an audio function, a video function, a navigation function, and a call-making function and an inputter 43 configured to receive a control command from a user may be provided at a center fascia 62, which is a central area of a dashboard 61 inside the vehicle 1.

The display 41 may be implemented with any one of various display devices such as a liquid crystal display (LCD), a light emitting diode (LED) display a plasma display panel (PDP), an organic LED (OLED) display, and a cathode ray tube (CRT) display.

The user may manipulate the inputter 43 and input a command for controlling the vehicle 1. The inputter 43 may be provided as a hard key in an area adjacent to the display 41. The display 41 may also perform a function of the inputter 43 when the display 41 is implemented as a touch-screen.

The vehicle 1 may also receive a control command from the user by speech of the user through the speech inputter 10. The speech inputter 10 may be implemented as a microphone configured to receive sound and output the received sound as an electrical signal.

The speech inputter 10 may be installed at a headliner 64 as illustrated in FIG. 3 for effective speech input. However, an implementation of the vehicle 1 is not limited thereto, and the speech inputter 10 may also be installed on the dashboard 61 or a steering wheel 65, or at any other suitable location. Moreover, the speech inputter 10 may be installed at any position at which the speech inputter 10 suitably receives the user's speech.

Also, a speaker 42 configured to output sound required to perform control of the vehicle 1 may be provided inside the vehicle 1. For example, the speaker 42 may be provided at inner sides of a driver seat door 71L and a passenger seat door 71R.

The vehicle 1 may be connected to a mobile device 2 of the user and download data stored in the mobile device 2 or control the mobile device 2.

For example, the mobile device 2 may include an electronic device such as a wearable device including a personal digital assistant (PDA), a laptop, a tablet personal computer (PC), a smartphone, smart glasses, a smart watch, and the like. However, examples of the mobile device 2 are not limited thereto, and the mobile device 2 may be any electronic device that is portable, is able to store data, is able to connect to the vehicle 1 wirelessly or by wire, and is able to transmit data may be the mobile device 2. In an exemplary implementation that will be described below, a case in which the mobile device 2 is a smartphone will be described as an example.

Figure 4:
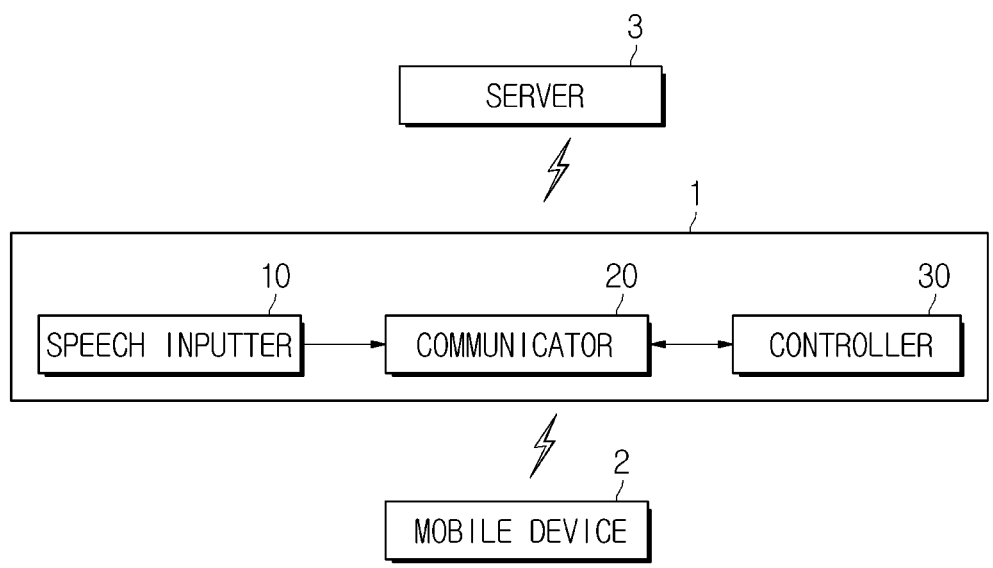
FIG. 4 is a control block diagram illustrating a relationship between a vehicle and a server according to exemplary implementations of the present disclosure.

FIG. 4 is a control block diagram illustrating a relationship between a vehicle and a server according to exemplary implementations of the present disclosure.

The speech processing apparatus 100 described above with reference to FIG. 1 may be included in the vehicle 1, an externally disposed server 3 or the mobile device 2.

Alternatively, some elements of the speech processing apparatus 100 may be included in the vehicle 1, and the rest of the elements thereof may be included in the externally disposed server 3.

For example, the speech recognizer 110 of the speech processing apparatus 100 may be included in the server 3, and the speech processor 120 and the storage 130 may be included in the vehicle 1. Alternatively, the speech recognizer 110 and the speech processor 120 may be included in the server 3, and the storage 130 may be included in the vehicle 1.

In an example, the speech processing apparatus 100 will be described by assuming that the speech processing apparatus 100 is included in the externally disposed server 3. When the speech processing apparatus 100 is included in the externally disposed server 3, data storage capacity or data processing performance of the speech processing apparatus 100 does not depend on data storage capacity or data processing performance of the vehicle 1 or the mobile device 2.

Referring to FIG. 4, the vehicle 1 exemplarily includes the speech inputter 10 configured to receive speech of a user, a communicator configured to communicate with the mobile device 2 and the server 3 and transmit and receive data thereto and therefrom, and a controller 30 configured to control the vehicle 1.

The communicator 20 may include one or more communication devices configured to enable communication with an external device. For example, the communicator 20 may include one or more of a short range communication device, a wired communication device, and a wireless communication device.

The short range communication device may include various short range communication devices, such as a Bluetooth device, an infrared communication device, a radio frequency identification (RFID) communication device, and a wireless local area network (WLAN), that transmit and receive a signal using a wireless network over a short distance.

The wired communication device may include various wired communication devices such as a LAN device, a wide area network (WAN) device, and a value added network (VAN) device and various cable communication devices such as a universal serial bus (USB) device, a high definition multimedia interface (HDMI) device, a digital visual interface (DVI) device, a recommended standard 232 (RS-232) device, a power cable communication device, and a plain old telephone service (POTS) device.

The wireless communication device may include a wireless fidelity (Wi-Fi) device, a wireless broadband device, and other wireless communication devices that support various wireless communication methods such as global system for mobile communication (GSM), code division multiple access (CDMA), wideband code division multiple access (WCDMA), universal mobile telecommunications system (UMTS), time division multiple access (TDMA) and long term evolution (LTE).

Also, the wireless communication device may include an antenna, a transmitter, and a receiver that are configured to transmit and receive a signal.

The wireless communication device may further include a signal conversion device configured to modulate a digital control signal as an analog wireless signal and demodulate a received analog wireless signal back into a digital control signal.

Also, the communicator 20 may further include an internal communication device configured to perform communication between electronic devices inside the vehicle 1. A controller area network (CAN), a local interconnection network (LIN), FlexRay, Ethernet, and the like may be used as an internal communication protocol of the vehicle 1.

The communicator 20 may transmit and receive data to and from the server 3 using the wireless communication device, and may transmit and receive data to and from the mobile device 2 using the short range communication device or the wired communication device.

For example, a user in the vehicle 1 may connect the mobile device 2 to the vehicle 1 by using Bluetooth communication. The user may include a driver as well as a passenger of the vehicle 1, and all passengers of the vehicle 1 may be the user.

The mobile device 2 and the vehicle 1 may be connected via the short range communication device of the communicator 20, and user information stored in the mobile device 2 may be transmitted to the vehicle 1. For example, the user information transmitted to the vehicle 1 may be phone book data in which phone numbers are stored. The phone numbers stored in the mobile device 2 of the user and identification tags for identifying owners of the phone numbers are stored in the phone book data.

The phone book data transmitted to the vehicle 1 may be temporarily or permanently stored in a memory provided in the vehicle 1, and may be transmitted to the server 3 through the wireless communication device of the communicator 20.

The DB managing processor 140 included in the speech processing apparatus 100 of the server 3 may generate a user DB by using the phone book data transmitted thereto, and may store the generated user DB in the storage 130. Particularly, when there is more than one user of the vehicle 1, a DB may be generated and stored for each user.

As described above, the vehicle 1 may receive speech of the user. For example, when the user inputs speech into the speech inputter 10, the speech inputter 10 converts the input speech into an electrical signal.

The input speech may be temporarily or permanently stored in the memory provided in the vehicle 1, and may be transmitted to the server 3 through the wireless communication device of the communicator 20.

The speech recognizer 110 of the server 3 may recognize the speech transmitted thereto and output spoken language, and the speech processor 120 may acquire information on a relationship between a plurality of users from the spoken language.

When the spoken language is natural language, the speech processor 120 may apply natural language processing technology to find out an intention of speech of the user included in the spoken language. Consequently, the user may input a control command through natural dialogue, and the vehicle 1 may induce an input of a control command through a dialogue or output a dialogue through the speaker 42 to provide a service required by the user.

Meanwhile, family members often share a vehicle. Consequently, information on a relationship between users acquired by the speech processor 120 from the spoken language may be information on a family relationship.

For example, when information on a relationship between the first user and the second user acquired from spoken content of the first user is a father-daughter relationship, information indicating that the first user and the second user have a father-daughter relationship is added to the second user's phone number stored in the first user DB. When the first user is the father and the second user is the daughter, information indicating that the second user is the "daughter" as well as the second user's name may be tagged to the second user's phone number stored in the first user DB.

Also, when the second user rides in the vehicle 1 and connects her mobile device 2 to the vehicle 1, phone book data of the second user may be transmitted to the server 3, and the DB managing processor 140 may generate the second user DB by using the second user's phone book data.

The DB managing processor 140 may update the second user DB by reflecting the information on the relationship between the first user and the second user stored in the first user DB in the second user DB. That is, information indicating that the first user is the "father" as well as the first user's name may be tagged to the first user's phone number stored in the second user DB.

Figure 5:
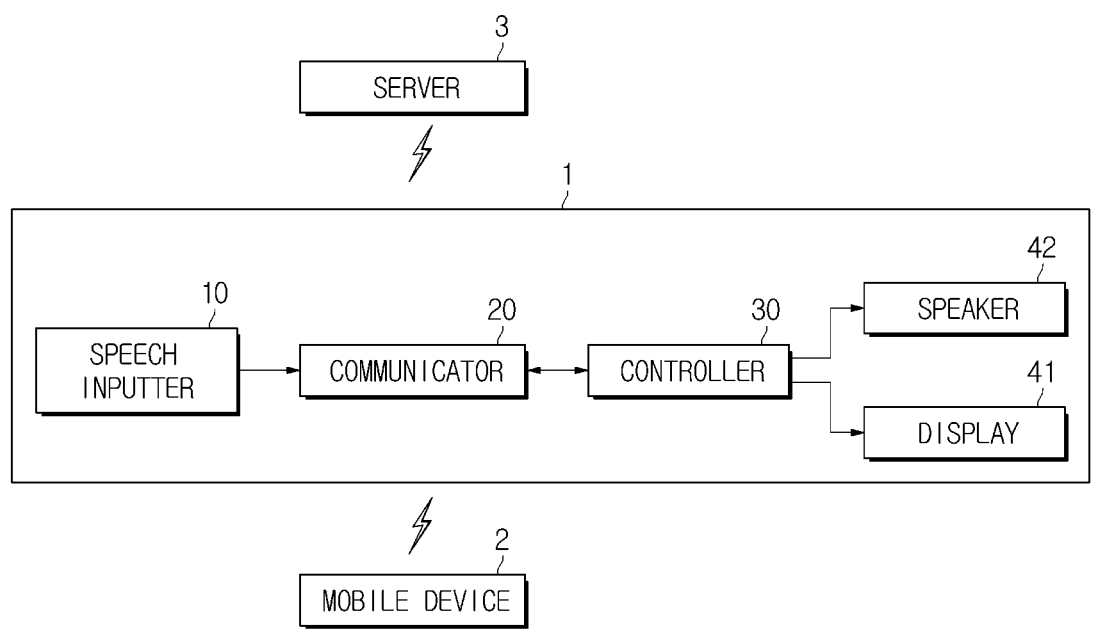
FIG. 5 is a control block diagram of a vehicle that provides feedback related to speech spoken by a user according to exemplary implementations of the present disclosure.

FIG. 5 is a control block diagram of a vehicle that provides feedback related to speech spoken by a user according to exemplary implementations of the present disclosure.

As described above with reference to FIG. 3, the display 41 configured to provide a user with visual information and the speaker 42 configured to provide the user with aural information may be provided inside the vehicle 1.

When the speech processing apparatus 100 recognizes speech spoken by the user and discovers an intention of speech of the user, the controller 30 may provide feedback related thereto through the display 41 or the speaker 42.

For example, the controller 30 may provide feedback by visually or aurally providing information required by the user, outputting a question to check the intention of the user's speech, or outputting a question related to additionally required information for performing control according to the intention of the user's speech when additional information is required for performing the control.

Particularly, when feedback related to the user's speech is aurally provided, a level of concentration on driving of the user who is driving may be prevented from being decreased due to the user looking at the display 41.

Figure 6:
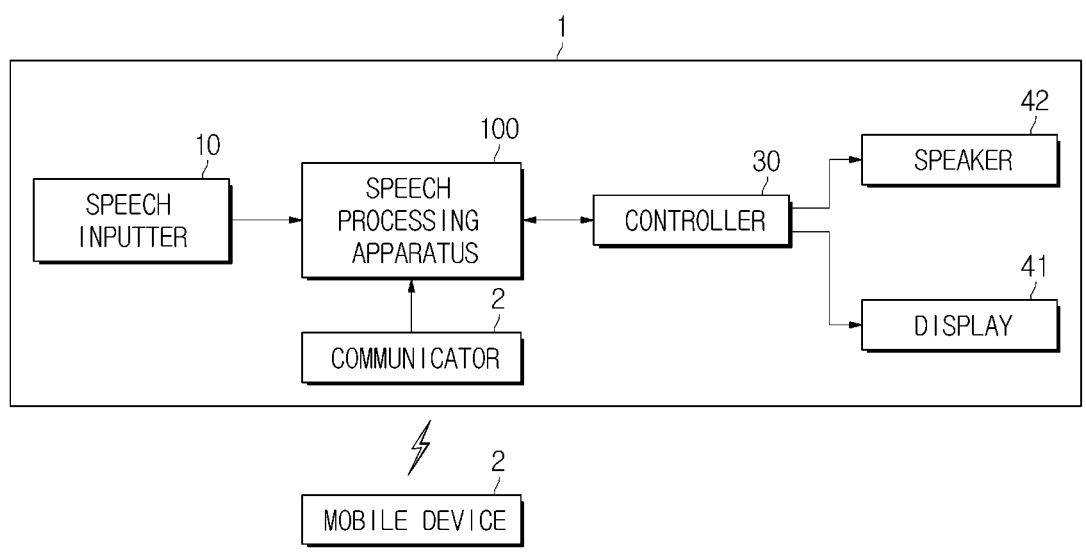
FIG. 6 is a control block diagram illustrating a relationship between a vehicle and a mobile device when the speech processing apparatus is included in the vehicle according to exemplary implementations of the present disclosure.

FIG. 6 is a control block diagram illustrating a relationship between a vehicle and a mobile device when the speech processing apparatus is included in the vehicle according to exemplary implementations of the present disclosure.

A case in which the speech processing apparatus 100 is included in the server 3 has been described above as an example. According to an example illustrated in FIG. 6, the speech processing apparatus 100 is included in the vehicle 1. In this case, communication with the server 3 is not required every time speech recognition, speech processing, or an information update is performed.

Other than speech input through the speech inputter 10 being transmitted to the speech processing apparatus 100 inside the vehicle 1, operations of the elements are the same as those described above with reference to FIG. 4.

Figure 7:
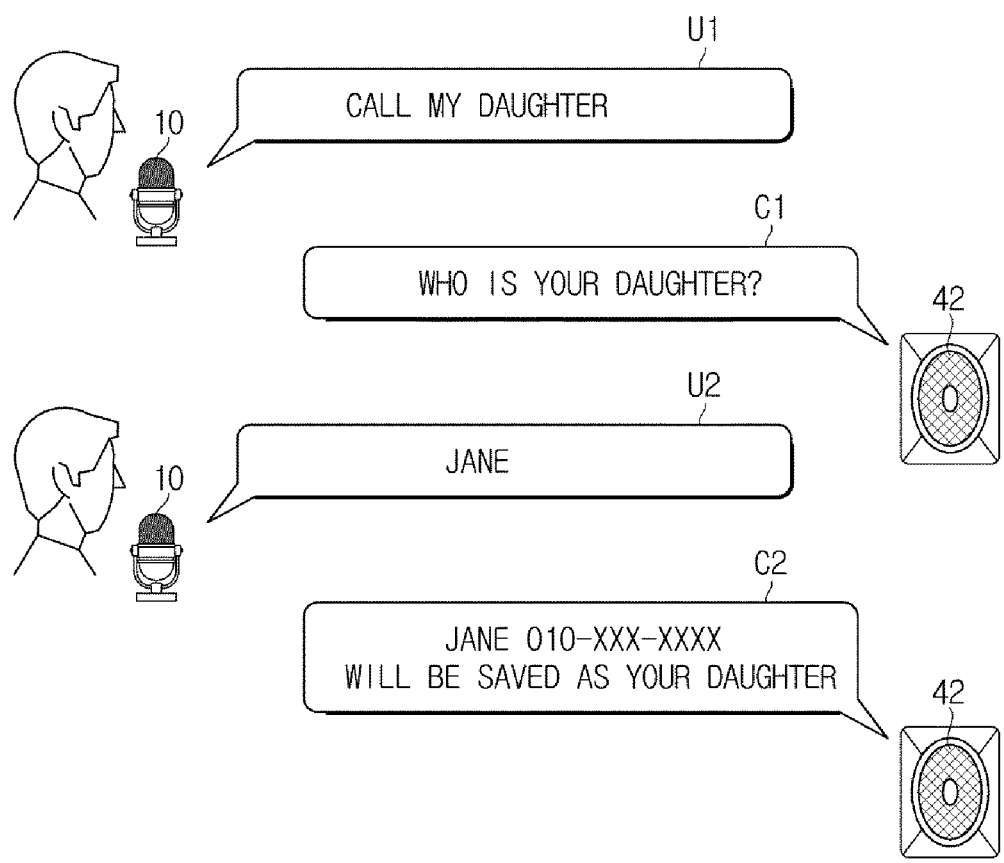
FIG. 7 is a view illustrating an example of a dialogue exchange between a user and a vehicle according to exemplary implementations of the present disclosure.
Figure 8:
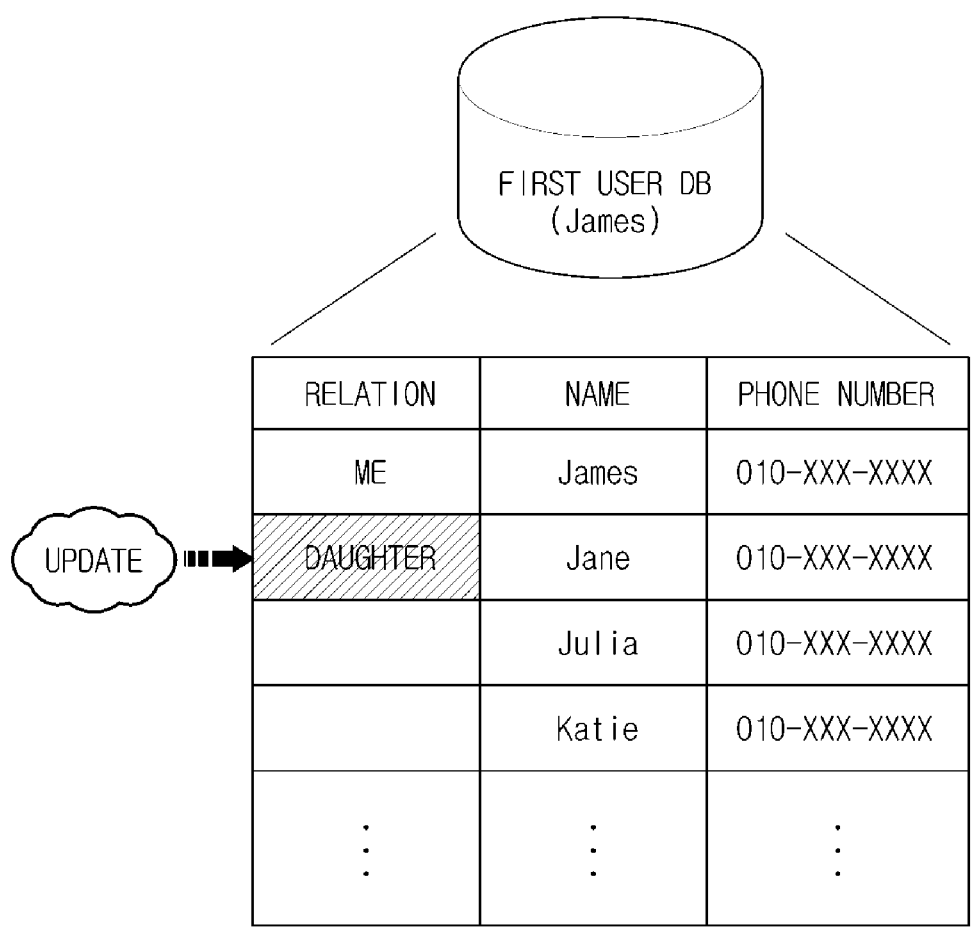
FIG. 8 is a view illustrating an example of information updated based on a dialogue exchange between the user and the vehicle according to exemplary implementations of the present disclosure.

FIG. 7 is a view illustrating an example of a dialogue exchange between a user and a vehicle according to exemplary implementations of the present disclosure, and FIG. 8 is a view illustrating an example of information updated based on a dialogue exchange between the user and the vehicle according to exemplary implementations of the present disclosure.

It is assumed that the first user is riding in the vehicle 1, the mobile device 2 of the first user has been connected to the vehicle 1, phone book data has been downloaded by the vehicle 1 and transmitted to the server 3, and the first user DB has been generated.

Referring to FIG. 7, when the first user inputs speech U1 ("Call my daughter.") for calling his daughter through the speech inputter 10, the speech inputter 10 transmits the speech U1 to the speech processing apparatus 100, and the speech recognizer 110 recognizes the first user's speech and outputs spoken language.

The speech processor 120 discovers that an intention of speech of the first user is to call his daughter on the basis of the spoken language and searches through the first user DB for his daughter's phone number. When there is no phone number tagged with "daughter" as a search result, the speech processor 120 may output speech C1 ("Who is your daughter?") for identifying the first user's daughter through the speaker 42 as feedback related to the search result.

The first user may input speech U2 ("Jane") for providing his daughter's name through the speech inputter 10, and the speech processing apparatus 100 may recognize the speech U2 and acquire information that the name of the first user's daughter is Jane. That is, the speech processing apparatus 100 may discover that the first user and Jane have a father-daughter relationship.

The speech processing apparatus 100 may update the first user DB by reflecting the information that the first user and Jane have a father-daughter relationship in the first user DB.

First, referring to FIG. 8, phone numbers saved by the first user and identification tags for identifying owners of the phone numbers may be stored in the first user DB. Here, an identification tag may be a name or a title that is directly set by the first user. Types of name or title are not limited and may be a company name, an appellation, a designation, a nickname and the like.

A search result corresponding to Jane's phone number is not returned when "daughter" is searched for even though Jane's phone number is stored in the first user DB because the phone number is only tagged with the identification tag "Jane." Because the speech processor 120 has acquired information that Jane is the first user's daughter from the dialogue between the first user and the vehicle 1, the DB managing processor 140 may save the relationship between the first user and Jane as "daughter" in the first user DB. A relationship saved in a user DB is a relationship of someone to a corresponding user.

Referring again to FIG. 7, the speaker 42 may output speech C2 ("Jane will be saved as your daughter.") for notifying the first user that the first user DB will be updated using the relationship between the first user and Jane.

Also, the controller 30 may transmit a control signal to the mobile device 2 connected to the vehicle 1 and attempt to call Jane.

A relationship between the first user and an owner of each phone number may also serve as an identification tag of each of the phone numbers. That is, a second identification tag for identifying a second user's phone number may include information on a relationship between the first user and the second user as well as the second user's name. Consequently, when the first user requests that a call to his daughter be made again in the future, "daughter" may be searched for in the first user DB, and Jane's phone number may be found.

Figure 9:
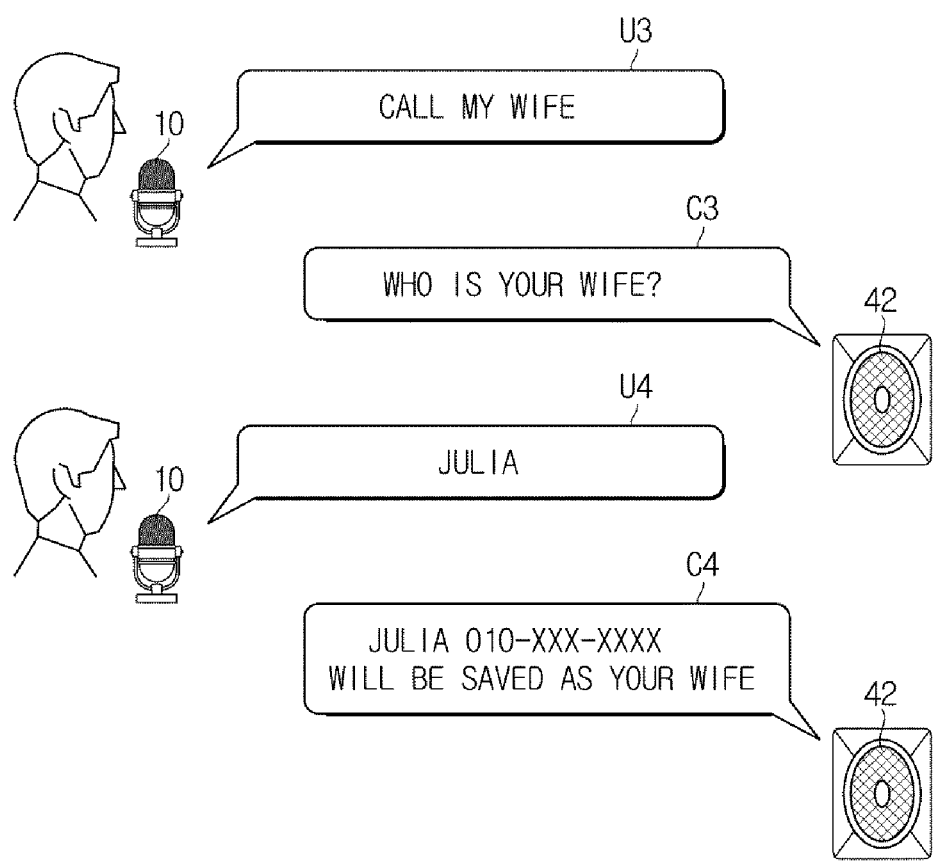
FIG. 9 is a view illustrating another example of a dialogue exchange between a user and a vehicle according to exemplary implementations of the present disclosure.
Figure 10:
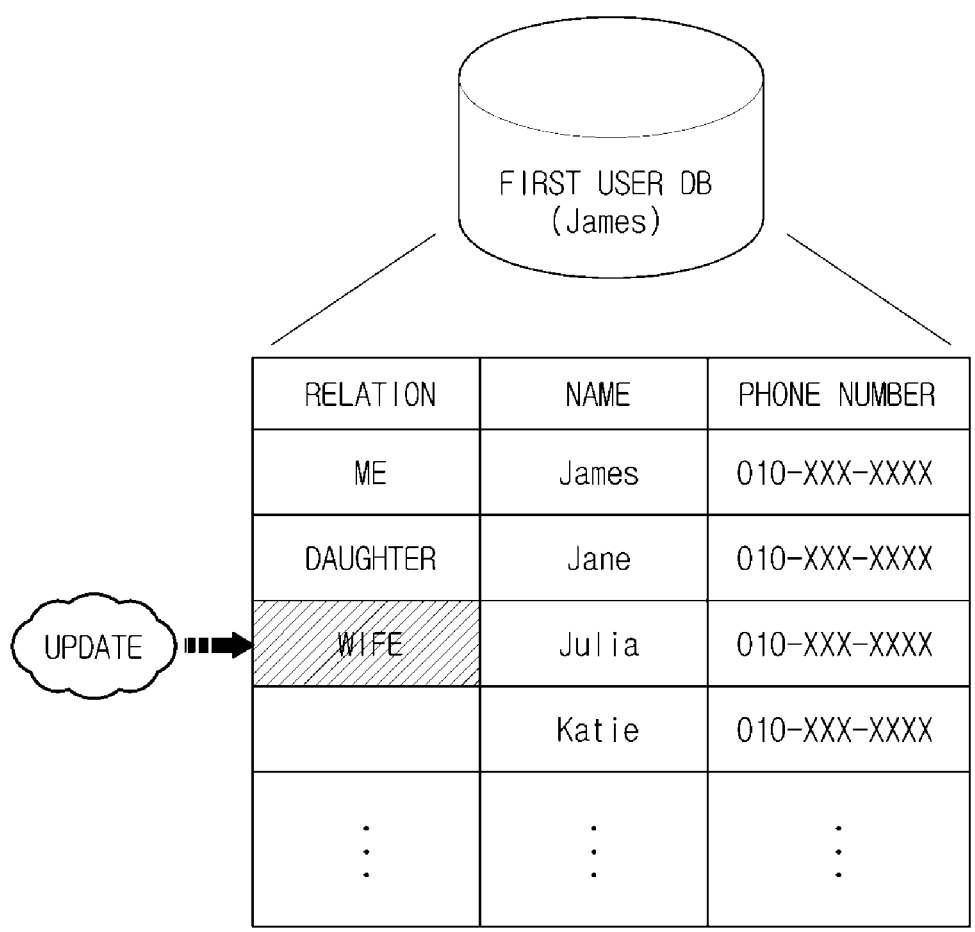
FIG. 10 is a view illustrating an example of information updated based on the dialogue of FIG. 9.

FIG. 9 is a view illustrating an example of a dialogue exchange between a user and a vehicle according to exemplary implementations of the present disclosure, and FIG. 10 is a view illustrating an example of information updated based on the dialogue illustrated in FIG. 9.

When the first user inputs speech U3 ("Call my wife.") for calling his wife through the speech inputter 10, the speech inputter 10 transmits the speech U3 to the speech processing apparatus 100, and the speech recognizer 110 recognizes the transmitted speech and outputs spoken language of the first user.

The speech processor 120 discovers that an intention of speech of the first user is to call his wife on the basis of the spoken language of the first user and searches through the first user DB for his wife's phone number. When there is no phone number tagged with "wife" as a search result, the speech processor 120 may output speech C3 ("Who is your wife?") for identifying the first user's wife through the speaker 42 as feedback related to the search result.

The first user may input speech U4 ("Julia") for providing his wife's name through the speech inputter 10, and the speech processing apparatus 100 may recognize the speech U4 and acquire information that the name of the first user's wife is Julia. That is, the speech processing apparatus 100 may discover that the first user and Julia have a husband-wife relationship.

The speech processing apparatus 100 may update the first user DB by reflecting the information that the first user and Julia have a husband-wife relationship in the first user DB.

Referring to FIG. 10, a search result corresponding to Julia's phone number is not returned when "wife" is searched for even though Julia's phone number is stored in the first user DB because the phone number is only tagged with the identification tag "Julia." Because the speech processor 120 has acquired information that Julia is the first user's wife from the dialogue between the first user and the vehicle 1, the DB managing processor 140 may save the relationship between the first user and Julia as "wife" in the first user DB.

Also, the controller 30 may transmit a control signal to the mobile device 2 connected to the vehicle 1 and attempt to call Julia.

Referring again to FIG. 9, the speaker 42 may output speech C4 ("Julia will be saved as your wife.") for notifying the first user that the first user DB will be updated using the relationship between the first user and Julia.

When the first user requests that a call to his wife be made again in the future, "wife" may be searched for in the first user DB, and Julia's phone number may be found.

Figure 11:
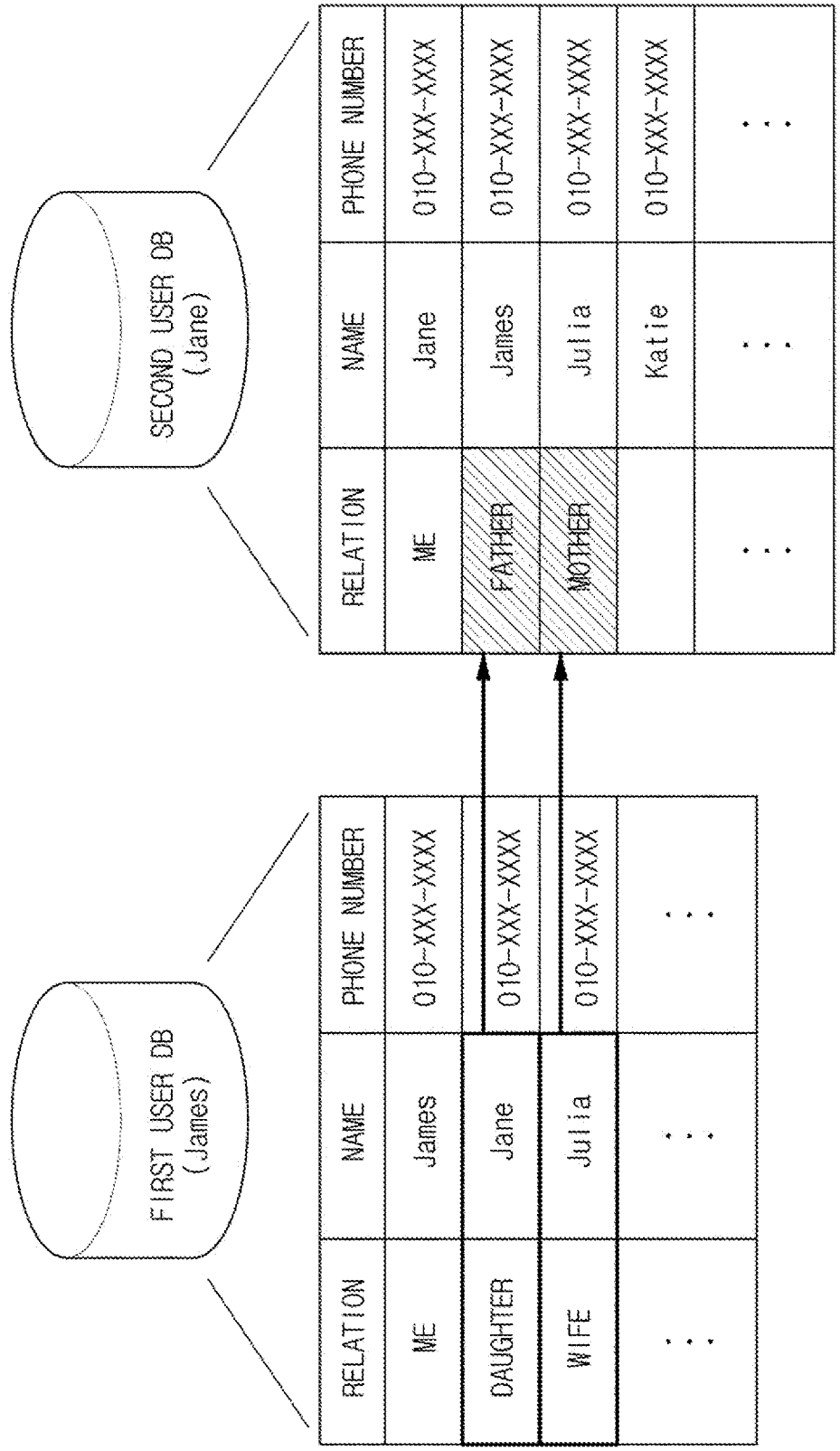
FIG. 11 is a view illustrating an operation in which a second user DB is updated on the basis of information stored in a first user DB according to exemplary implementations of the present disclosure.

FIG. 11 is a view illustrating an operation in which a second user DB is updated on the basis of information stored in a first user DB according to exemplary implementations of the present disclosure.

When Jane, who is the second user, rides in the vehicle 1, and the mobile device 2 of the second user is connected to the vehicle 1, phone book data stored in the second user's mobile device 2 is downloaded by the vehicle 1 and transmitted to the server 3, and the second user DB is generated.

Like the first user DB described above, phone numbers saved by the second user and identification tags (names and relations) for identifying owners of the phone numbers may be stored in the second user DB.

The DB managing processor 140 may determine that a phone number stored with the identification tags "Jane" (name) and "daughter" (relation) in the first user DB matches the second user's phone number. From this, the DB managing processor 140 may determine that the second user is Jane.

When the second user has already saved her name in her mobile device 2, the second user's name may also be saved as Jane in the second user DB. Otherwise, the second user's name may be updated to be Jane according to a determination by the DB managing processor 140.

Likewise, when the first user's name is not saved in the first user DB, the DB managing processor 140 may save the first user's name as James in the first user DB by reflecting information that a name corresponding to the first user's phone number in the second user DB is James.

The DB managing processor 140 may update the second user DB based on information stored in the first user DB.

For example, based on the information stored in the first user DB indicating that the second user is the first user's "daughter," the DB managing processor 140 may save a relationship between the first user and the second user as "father" in the second user DB.

Also, based on the information stored in the first user DB indicating that the first user's wife is Julia, the DB managing processor 140 may determine that the second user's mother is Julia and save a relationship between the second user and Julia as "mother" in the second user DB.

A relationship between the second user and an owner of each phone number may also serve as an identification tag of each phone number. That is, a first identification tag for identifying the first user's phone number may include information on the relationship between the first user and the second user as well as the name of the first user. Consequently, when the second user requests that a call to her father be made again in the future, "father" may be searched for in the second user DB, and James's phone number may be found.

Figure 12:
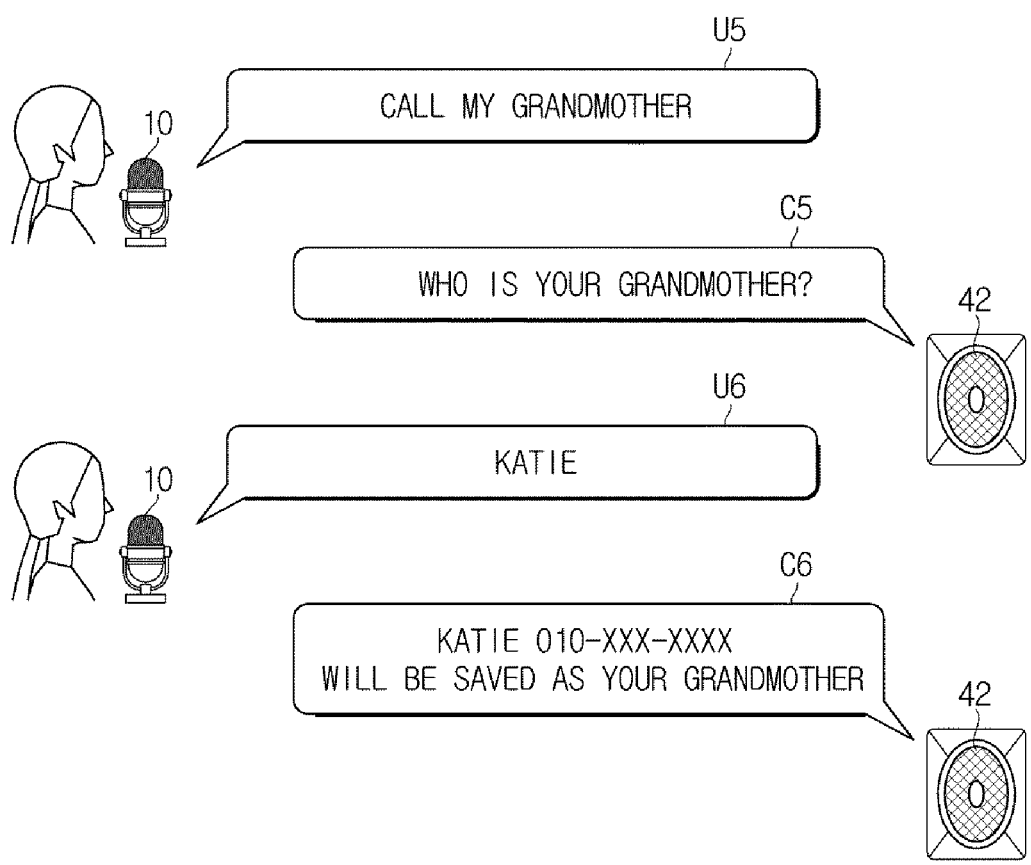
FIG. 12 is a view illustrating another example of a dialogue exchange between a user and a vehicle according to exemplary implementations of the present disclosure.
Figure 13:
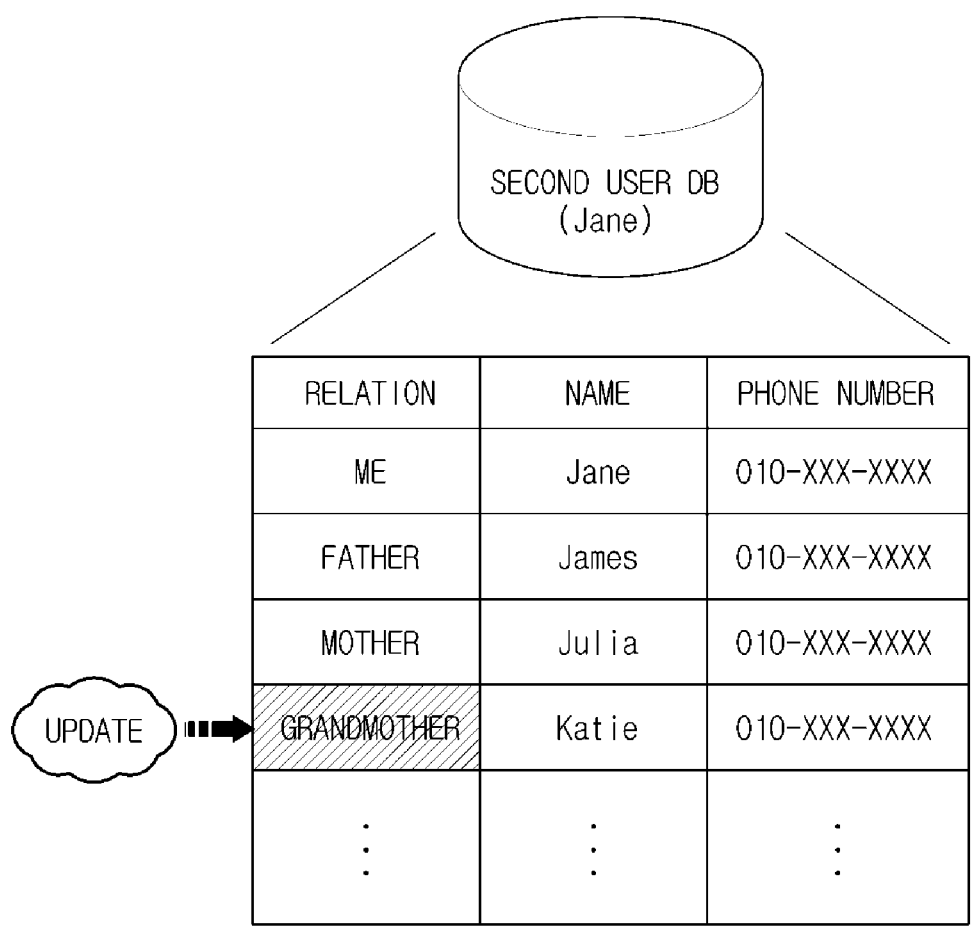
FIG. 13 is as view illustrating an example of information updated based on the dialogue of FIG. 12.

FIG. 12 is a view illustrating an example of a dialogue exchange between a user and a vehicle according to exemplary implementations of the present disclosure, and FIG. 13 is as view illustrating an example of information updated based on the dialogue illustrated in FIG. 12.

As illustrated in FIG. 12, when the second user inputs speech U5 ("Call my grandmother.") for calling her grandmother through the speech inputter 10, the speech inputter 10 transmits the speech U5 to the speech processing apparatus 100, and the speech recognizer 110 recognizes the transmitted speech and outputs spoken language of the second user.

The speech processor 120 discovers that an intention of speech of the second user is to call her grandmother on the basis of the spoken language of the second user and searches through the second user DB for her grandmother's phone number. When there is no phone number tagged with "grandmother" as a search result, the speech processor 120 may output speech C5 ("Who is your grandmother?") for identifying the second user's grandmother through the speaker 42 as feedback related to the search result.

The second user may input speech U6 ("Katie") for providing her grandmother's name through the speech inputter 10, and the speech processing apparatus 100 may recognize the speech U6 and acquire information that the name of the second user's grandmother is Katie. The speech processing apparatus 100 may update the second user DB by reflecting the information that the second user's grandmother is Katie in the second user DB.

Referring to FIG. 13, a search result corresponding to Katie's phone number is not returned when "grandmother" is searched for even though Katie's phone number is stored in the second user DB because the phone number is only tagged with the identification tag "Katie." Because the speech processor 120 has acquired information that Katie is the second user's grandmother from the dialogue between the second user and the vehicle 1, the DB managing processor 140 may save the relationship between the second user and Katie as "grandmother" in the second user DB.

Also, the controller 30 may transmit a control signal to the mobile device 2 connected to the vehicle 1 and attempt to call Katie.

Referring again to FIG. 12, the speaker 42 may output speech C6 ("Katie will be saved as your grandmother.") for notifying the second user that the second user DB will be updated using the relationship between the second user and Katie.

When the second user requests that a call to her grandmother be made again in the future, "grandmother" may be searched for in the second user DB, and Katie's phone number may be found.

Figure 14:
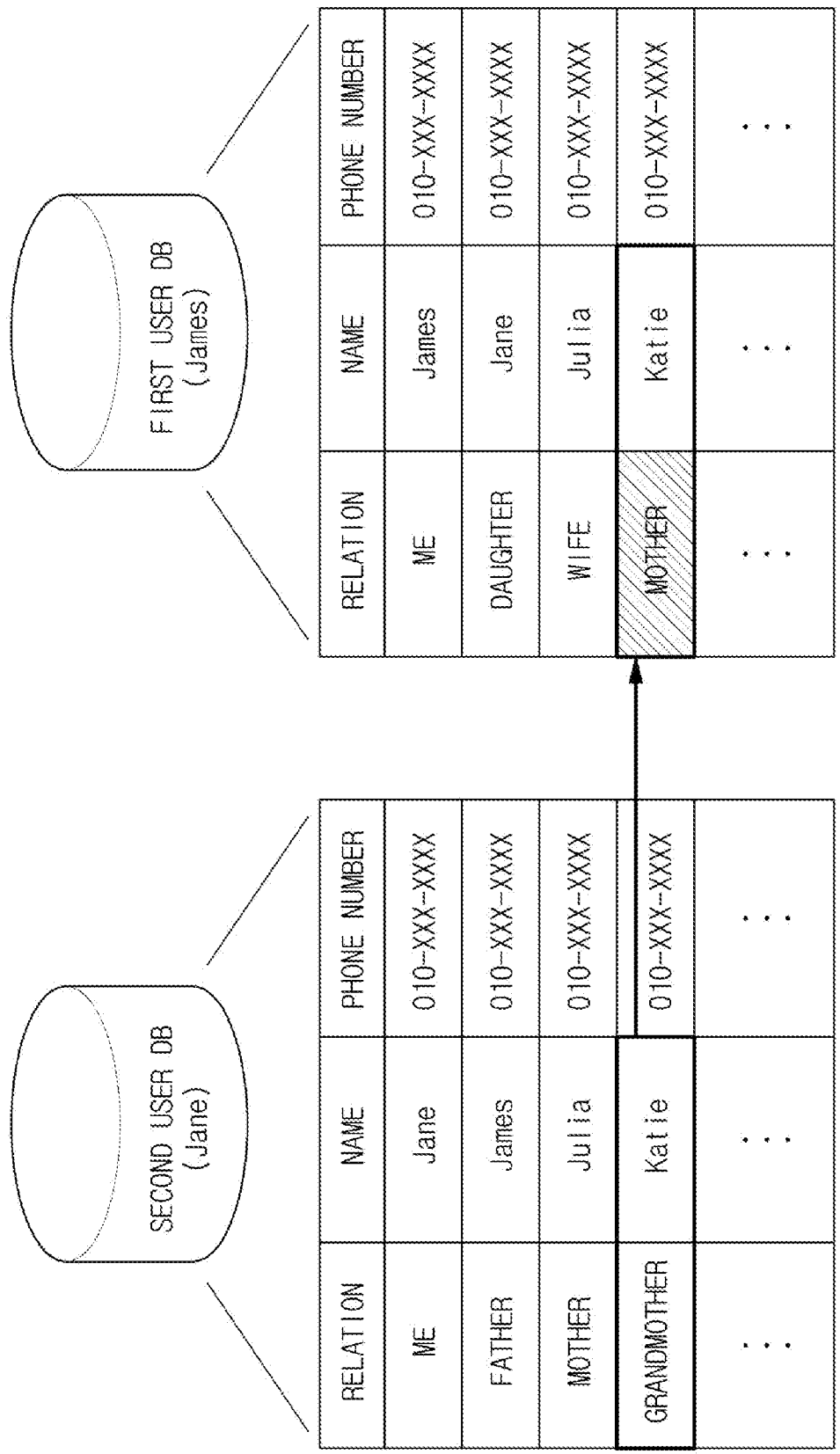
FIG. 14 is a view illustrating an operation in which a first user DB is updated on the basis of information stored in a second user DB according to exemplary implementations of the present disclosure.

FIG. 14 is a view illustrating an operation in which a first user DB is updated on the basis of information stored in a second user DB according to exemplary implementations of the present disclosure.

From the information indicating that the second user (Jane)'s grandmother is Katie, the DB managing processor 140 may acquire information indicating that the mother of the first user (James), who is the second user's father, is Katie. Consequently, as illustrated in FIG. 14, a relationship between the first user and Katie may be saved as "mother" in the first user DB.

Figure 15:
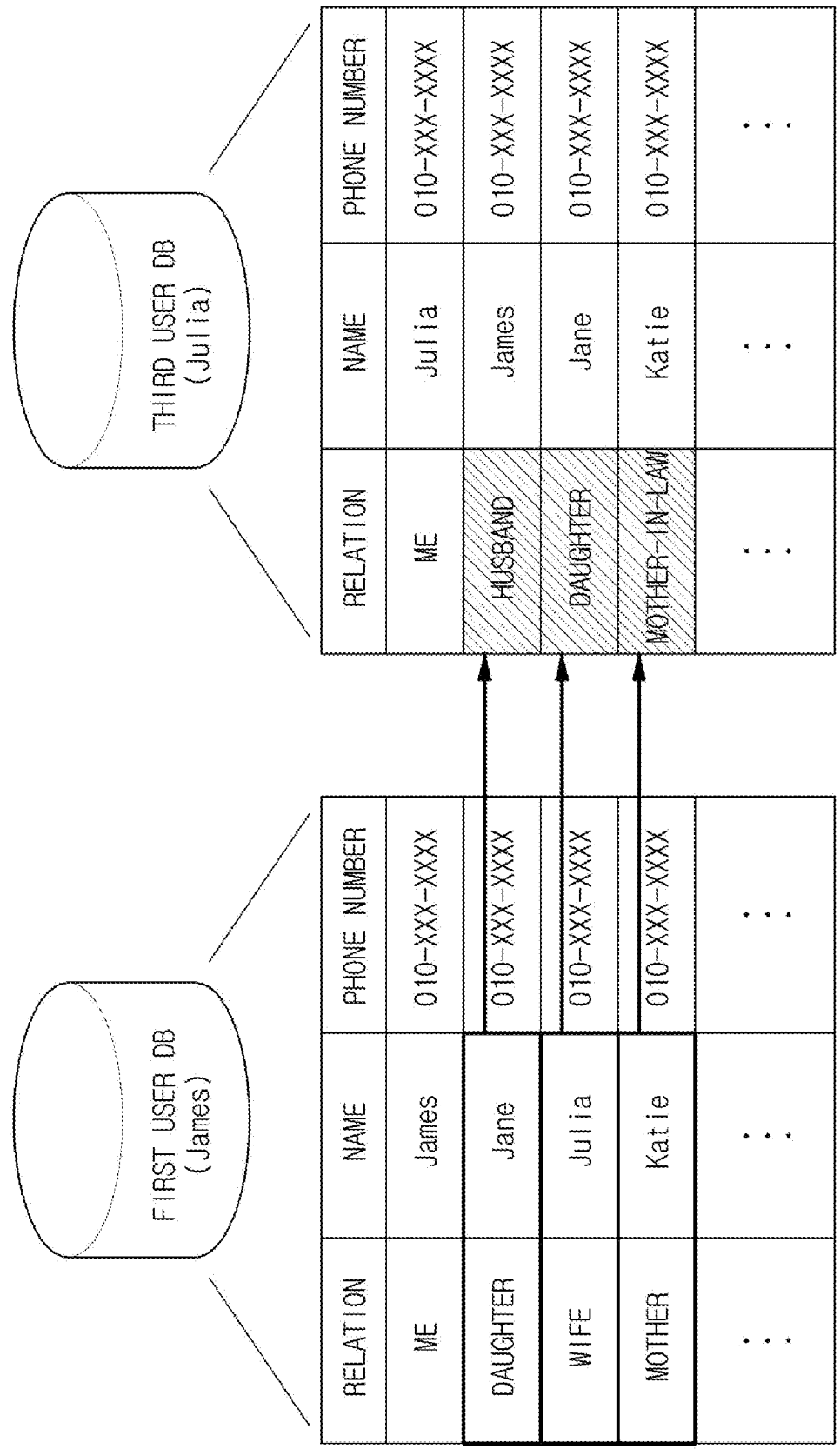
FIG. 15 is a view illustrating an operation in which a third user DB is updated on the basis of information stored in the first user DB according to exemplary implementations of the present disclosure.

FIG. 15 is a view illustrating an operation in which a third user DB is updated on the basis of information stored in the first user DB according to exemplary implementations of the present disclosure.

When Julia, who is the third user, rides in the vehicle 1, and the mobile device 2 of the third user is connected to the vehicle 1, phone book data stored in the third user's mobile device 2 is downloaded by the vehicle 1 and transmitted to the server 3, and the third user DB is generated.

Like the first user DB and the second user DB described above, phone numbers saved by the third user and identification tags (names and relations) for identifying owners of the phone numbers may be stored in the third user DB.

The DB managing processor 140 may determine that a phone number stored with the identification tags "Julia" (name) and "wife" (relation) in the first user DB matches the third user's phone number. From this, the DB managing processor 140 may determine that the third user is Julia.

When the third user has already saved her name in her mobile device 2, the third user's name may also be saved as Julia in the third user DB. Otherwise, the third user's name may be saved as Julia according to a determination by the DB managing processor 140.

The DB managing processor 140 may update the third user DB based on information stored in the first user DB.

For example, based on the information stored in the first user DB indicating that the first user (James)'s wife is Julia, the DB managing processor 140 may determine that the third user's husband is James and save a relationship between the third user and James as "husband" in the third user DB.

Based on the information stored in the first user DB indicating that the second user (Jane) is the first user's "daughter," the DB managing processor 140 may save a relationship between the third user and Jane as "daughter" in the third user DB.

Also, based on the information stored in the first user DB indicating that Katie is the first user's "mother," the DB managing processor 140 may save a relationship between the third user and Katie as "mother-in-law" in the third user DB.

When updating the third user DB, information stored in the second user DB may be used instead of the information stored in the first user DB, or both of the information stored in the first user DB and the information stored in the second user DB may be used.

In the exemplary implementations described above, cases in which the speech processing apparatus 100 acquires information on a relationship between a plurality of users or a relationship between a user and another family member from a dialogue with a user and updates a user DB by reflecting the information in the user DB have been described.

However, implementations of the speech processing apparatus 100 are not limited thereto. Unlike the implementations described above, the speech processing apparatus 100 may acquire information on a name of another user or another family member from a dialogue with a user and update a user DB by reflecting the information in the user DB.

Also, although a case in which a plurality of users sharing the vehicle 1 are in the same family has been described in the above implementations, implementations of the speech processing apparatus 100 and the vehicle 1 may also be identically applied to a case in which a plurality of users sharing the vehicle 1 work at the same workplace. That is, implementations of the present disclosure are applicable to any other case in addition to the case in which a plurality of users is in the same family as long as the plurality of users sharing the vehicle 1 belongs to the same group.

Specifically, when information on a relationship between two users is acquired on the basis of spoken language of the users, and information on a relationship between one of the two users and another member of a group to which the two users belong is acquired, information on a relationship between the other one of the two users and the other member may be determined using the above pieces of information and added to a user DB.

Also, although a case in which information stored in a user DB is a phone number has been described in the above implementations, information other than a phone number, such as a home address, may also be stored therein and managed.

Figure 16:
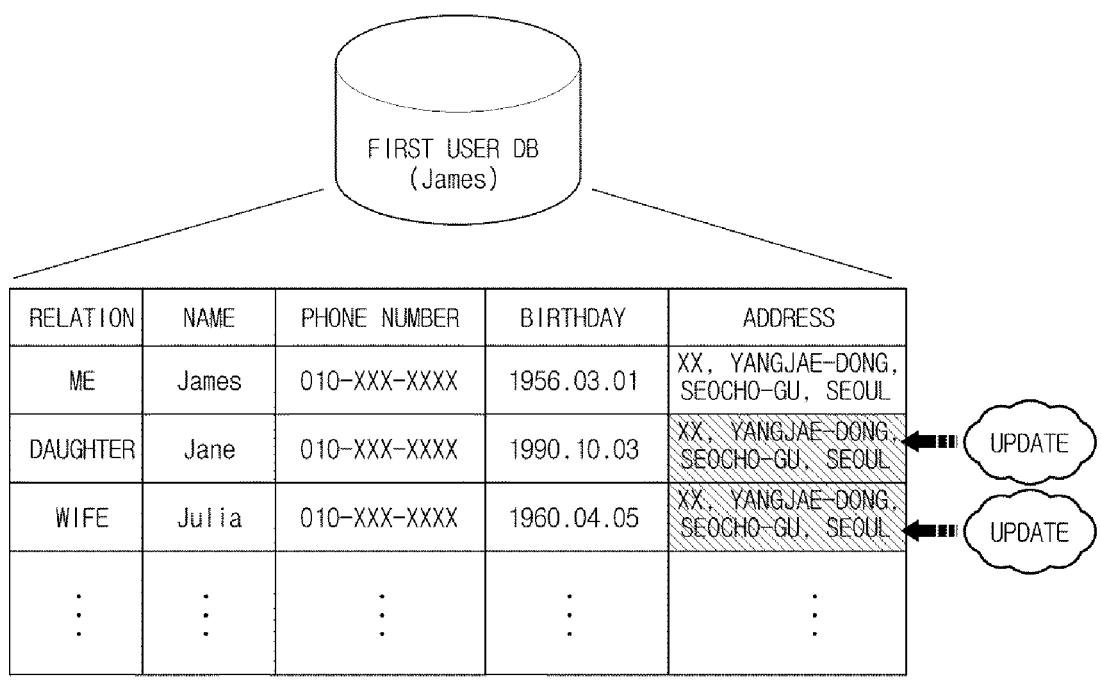
FIG. 16 is a view illustrating an example in which additional information other than a phone number is stored in a user DB according to exemplary implementations of the present disclosure.

FIG. 16 is a view illustrating an example in which additional information other than a phone number is stored in a user DB according to exemplary implementations of the present disclosure.

As illustrated in FIG. 16, a birthday or home address of an owner of a phone number may be further saved as additional information in the user DB. The additional information may be provided from the mobile device 2, may be separately input by a user, or may be provided from another external server that manages personal information of the user. A method of receiving additional information is not limited thereto.

For example, when a home address of the first user is stored in the first user DB, the DB managing processor 140 may save home addresses of the first user's daughter (Jane) and the first user's wife (Julia) as the same address.

When the second user's home address and the third user's home address are respectively stored in the second user DB and the third user DB, the first user DB may be updated by loading the home addresses of the second user and the third user from the second user DB and the third user DB.

Also, when the second user's birthday is stored in the second user DB, and the third user's birthday is stored in the third user DB, the first user DB may be updated by loading birthday information of the second user and birthday information of the third user from the second user DB and the third user DB.

The second user DB and the third user DB may also be updated with additional information in the same manner.

The speech processing apparatus 100 may proactively provide information required by a user based on additional information stored in a user DB. Hereinafter, this will be described with reference to FIGS. 17 and 18.

Figure 17:
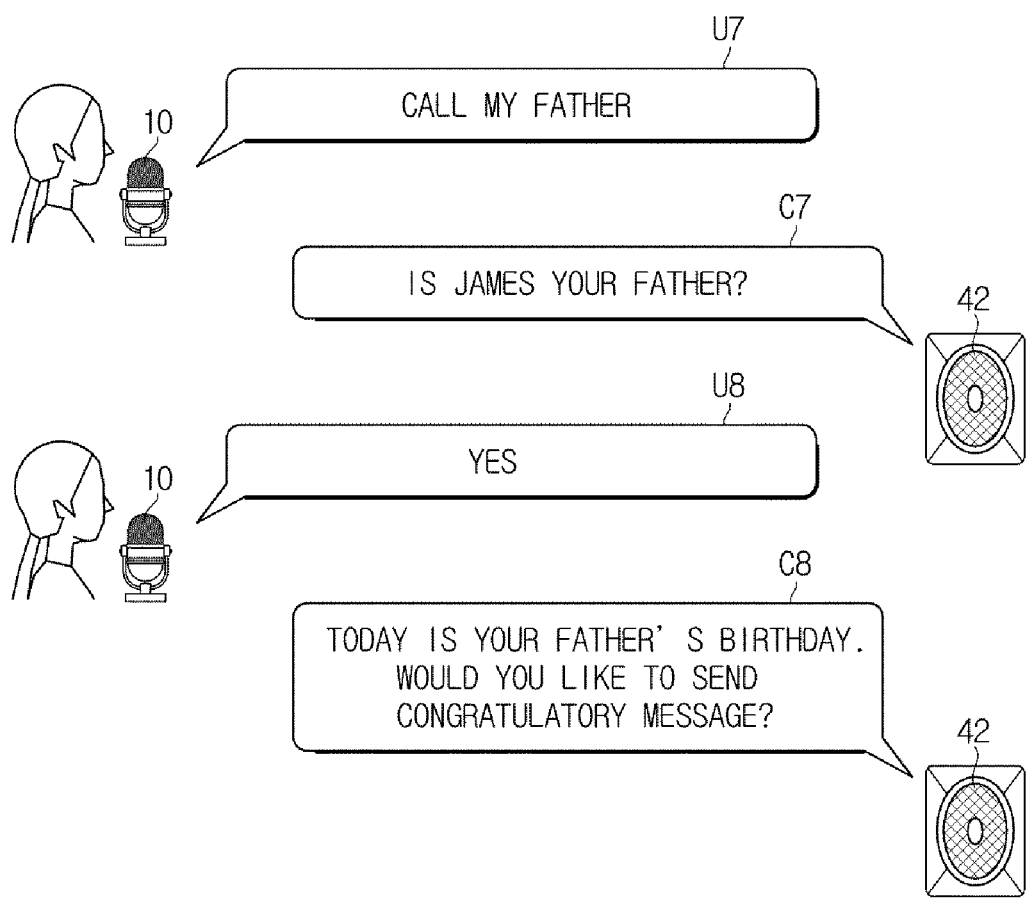
FIGS. 17 and 18 are views illustrating examples in which information required by a user is provided using additional information stored in a user DB according to exemplary implementations of the present disclosure.
Figure 18:
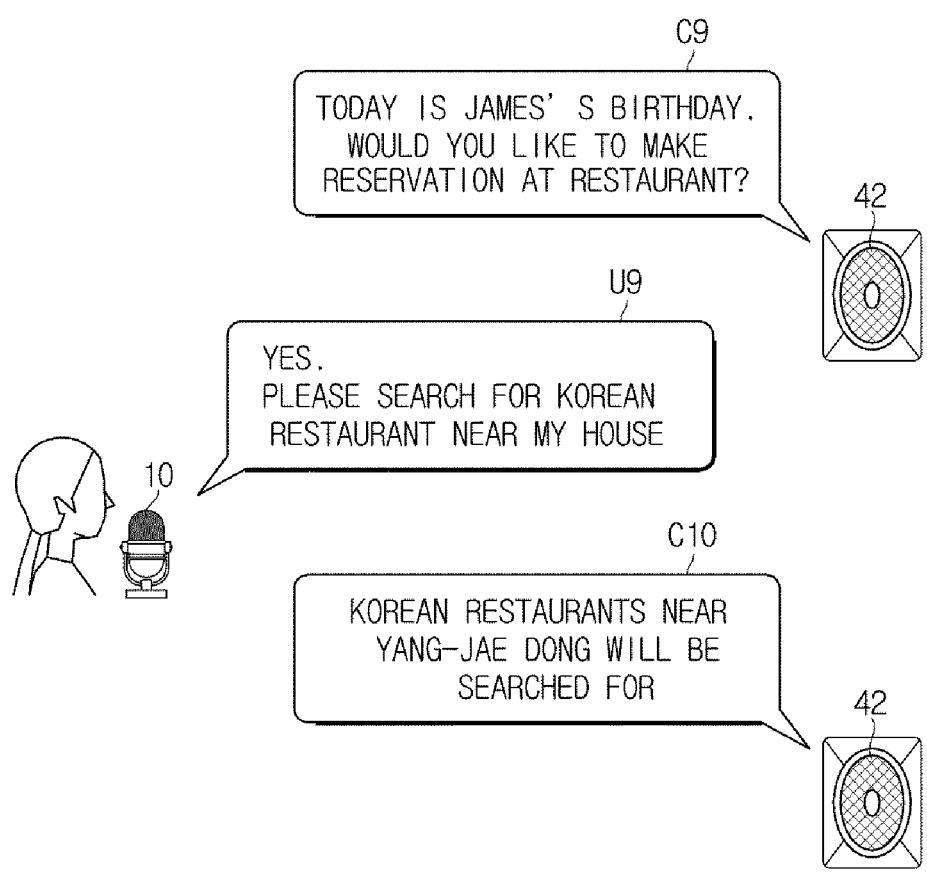

FIGS. 17 and 18 are views illustrating examples in which information required by a user is provided using additional information stored in a user DB.

As illustrated in FIG. 17, when the second user inputs speech U7 ("Call my father.") for calling her father through the speech inputter 10, the speech inputter 10 transmits the speech U7 to the speech processing apparatus 100, and the speech recognizer 110 recognizes the transmitted speech and outputs spoken language of the second user.

The speech processor 120 may discover that an intention of speech of the second user is to call her father on the basis of the spoken language of the second user and simultaneously acquire information indicating that the second user's father is James and that today is James's birthday from the second user DB.

When the speech processor 120 transmits a control signal to the controller 30 on the basis of the acquired information, speech C7 ("Is James your father?") for checking whether James is the second user's father is output through the speaker 42, and when the second user speaks speech U8 ("Yes") as an answer to the speech C7, the speaker 42 may output speech C8 ("Today is your father's birthday. Would you like to send a congratulatory message?") for simultaneously providing information indicating that today is James's birthday and asking whether the second user would like to send a congratulatory message.

That is, even when the second user is unaware of her father's birthday or is not interested in sending a congratulatory message, the speech processing apparatus 100 proactively provides information related thereto. In this way, active service may be provided.

As illustrated in FIG. 18, even when the second user does not speak, the speech processing apparatus 100 may speak in advance through the speaker 42 and output speech C9 ("Today is James's birthday. Would you like to make a reservation at a restaurant?") for simultaneously providing information indicating that today is James's birthday and asking whether the second user would like to make a reservation at a restaurant.

When the second user speaks speech U9 ("Yes, please search for a Korean restaurant near my house.") for making a reservation at a restaurant, the speech processor 120 may determine a region in which a restaurant should be searched for based on the home address information stored in the second user DB. Also, the speech processor 120 may output speech C10 ("Korean restaurants near Yangjae-dong will be searched for.") for informing the second user of information that will be searched for through the speaker 42.

The controller 30 may search for Korean restaurants near the second user's house by using a navigation device provided in the vehicle 1 or a map database stored in the server 3 or the vehicle 1, and may provide the second user with a search result.

The implementations described above are merely examples of services that may be provided to a user. Unlike the above, the vehicle 1 and the speech processing apparatus 100 may be combined, and various services may be provided using information on a relationship between a user and another user or another family member and additional information related thereto.

Hereinafter, a speech processing method according to exemplary implementations will be described. The speech processing apparatus 100 and the vehicle 1 according to the exemplary implementations described above may be used in performing the speech processing method according to the implementation. Consequently, the above descriptions related to the speech processing apparatus 100 and the vehicle 1 may be identically applied to the speech processing method according to an implementation.

Figure 19:
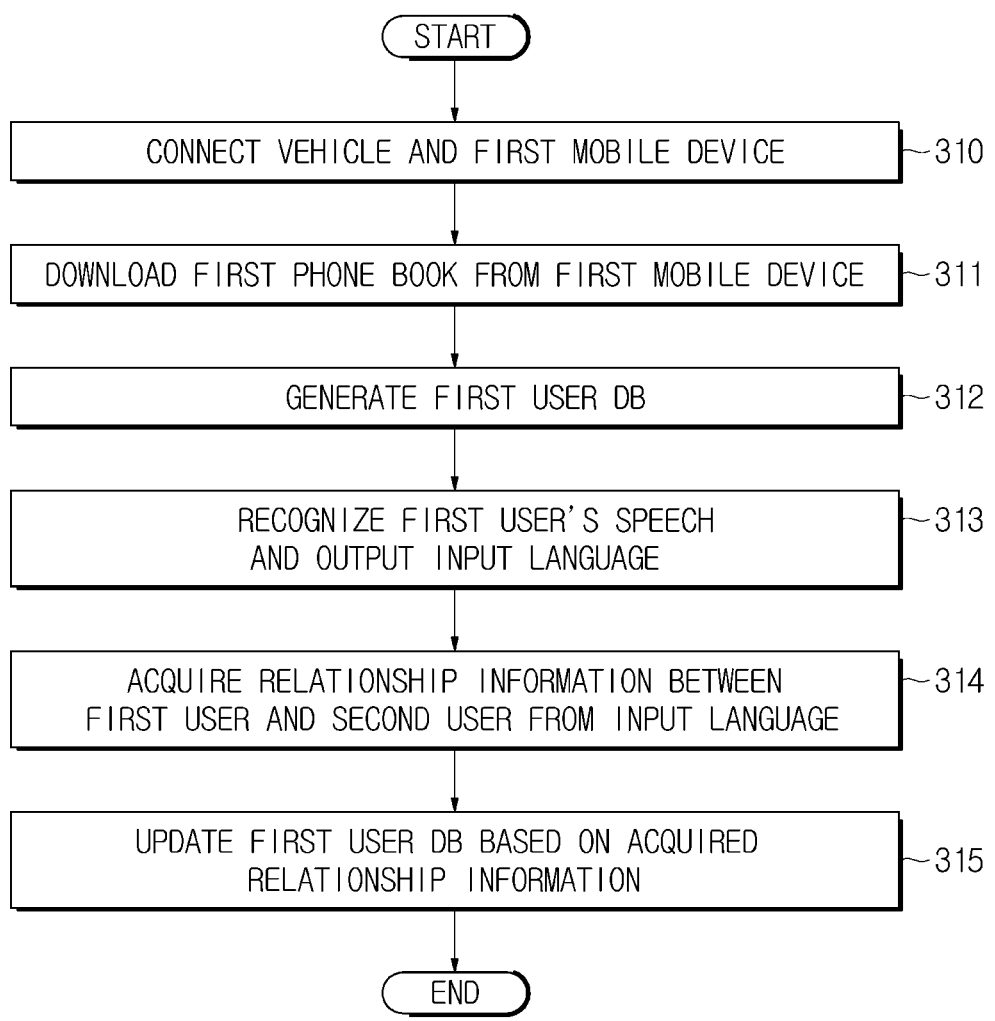
FIGS. 19 and 20 are flowcharts for describing a speech processing method according to exemplary implementations of the present disclosure.
Figure 20:
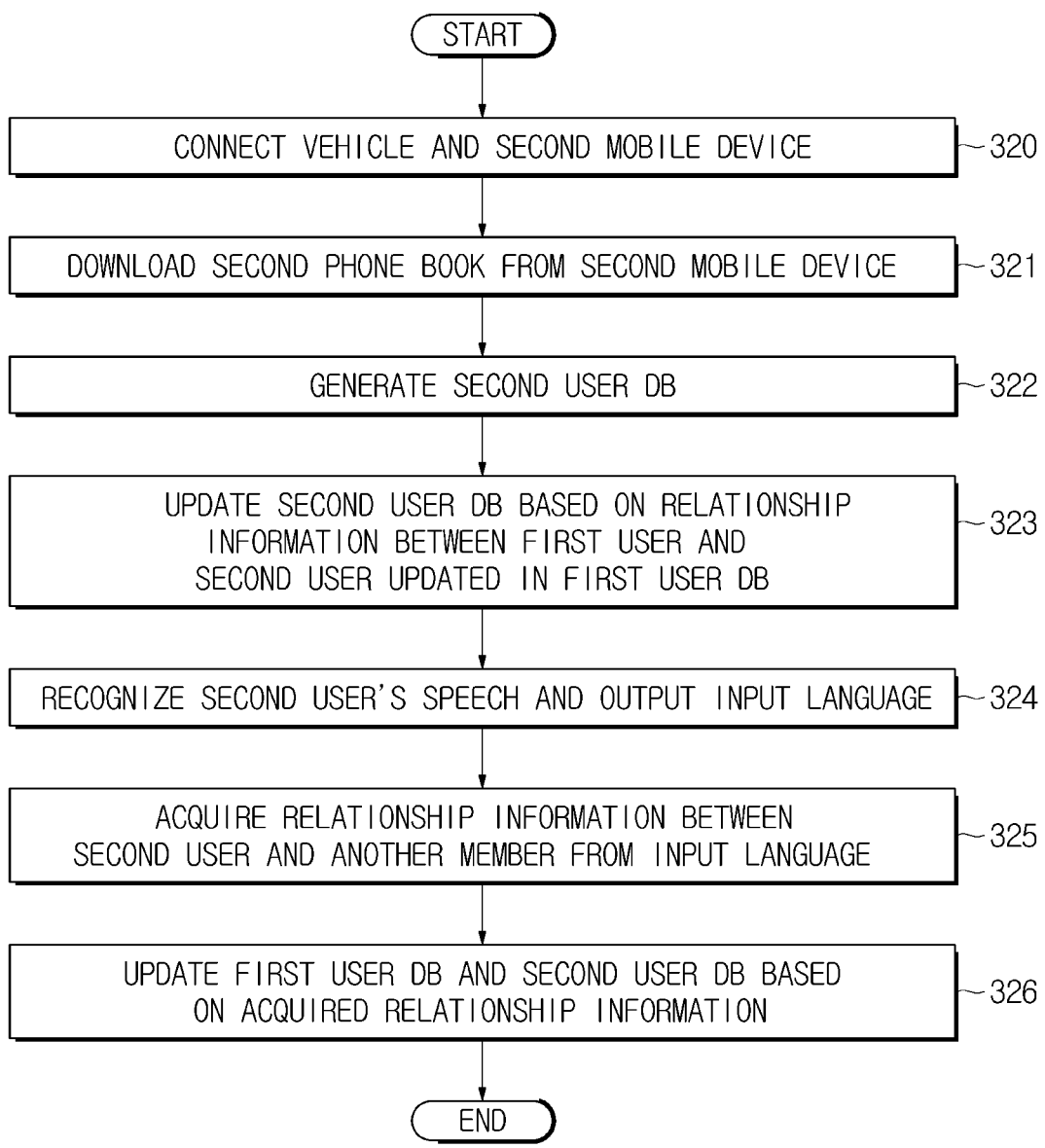

FIGS. 19 and 20 are flowcharts for describing a speech processing method according to an implementation. Not all steps illustrated in FIGS. 19 and 20 are required for the speech processing method. Some of the illustrated steps are required only for describing the speech processing method and may be removed from steps that constitute the speech processing method.

Referring to FIG. 19, a vehicle and a first mobile device are connected (310). The first mobile device refers to a first user's mobile device, and connection between the vehicle and the first mobile device may be performed by wireless communication or wired communication.

The vehicle downloads first phone book data from the first mobile device (311). Phone numbers saved in the first user's mobile device by the first user and identification tags for identifying owners of the phone numbers are stored together in the first phone book data.

A speech processing apparatus generates a first user DB by using the first phone book data (312). Information stored in the first phone book data may be used without change or by being changed to a form that facilitates speech recognition to generate the first user DB. An example of the first user DB is the same as that illustrated in FIG. 8. The generated first user DB is stored in the storage 130.

When the first user inputs speech into the speech inputter 10 provided in the vehicle 1, the speech processing apparatus recognizes the first user's speech and outputs spoken language (313). The speech inputter 10 converts the input speech into a speech signal and transmits the speech signal to the speech processing apparatus 100, and the speech recognizer 110 of the speech processing apparatus 100 recognizes the speech signal and outputs a result of the recognition. The result of the recognition includes language spoken and input by the first user, i.e., the spoken language.

The spoken language is assumed to contain information on a relationship between the first user and a second user.

A speech processor acquires the information on a relationship between the first user and the second user from the spoken language (314). For example, as in the example illustrated in FIG. 7, the first user may speak speech for calling his daughter, and information indicating that the second user is the first user's daughter may be provided from a dialogue between the first user and the speech processing apparatus 100. The speech processor 120 may acquire information indicating that the second user is the first user's daughter on the basis of the spoken language.

The first user DB may be updated on the basis of the acquired relationship information (315). The DB managing processor 140 may further store the relationship between the first user and the second user in the first user DB. For example, when the second user's name is Jane, and Jane's phone number is stored with the identification tag "Jane" in the first user DB, the DB managing processor 140 may save the relationship between the first user and Jane as "daughter" in the first user DB. Here, a relationship between the first user and an owner of each phone number may also serve as an identification tag. Consequently, when the first user says "daughter" instead of "Jane" to call the second user in the future, the speech processor 120 may immediately search for a phone number corresponding to "daughter," i.e., Jane's phone number, without additional inquiries and call Jane.

Referring to FIG. 20, a vehicle and a second mobile device are connected (320). The second mobile device refers to a second user's mobile device, and a connection between the vehicle and the second mobile device may be performed by wireless communication or wired communication.

The vehicle downloads second phone book data from the second mobile device (321). Phone numbers saved in the second user's mobile device by the second user and identification tags for identifying owners of the phone numbers are stored together in the second phone book data.

The speech processing apparatus generates a second user DB by using the second phone book data (322). Information stored in the second phone book data may be used without change or by being changed to a form that facilitates speech recognition to generate the second user DB. An example of the second user DB is the same as that illustrated in FIG. 11. The generated second user DB is stored in the storage 130.

The DB managing processor 140 updates the second user DB on the basis of information on a relationship between a first user and the second user updated in a first user DB (323). Specifically, the DB managing processor 140 may determine that a phone number stored with identification tags "Jane" (name) and "daughter" (relation) in the first user DB matches the second user's phone number. From this, the DB managing processor 140 may determine that the second user is Jane. On the basis of information indicating that the relationship between the first user and the second user stored in the first user DB is "daughter," the DB managing processor 140 may save the relationship between the first user and the second user as "father" in the second user DB. Also, when information on a relationship between the first user and another family member is also stored in the first user DB in addition to the information on the relationship between the first user and the second user, the DB managing processor 140 may determine information on a relationship between the second user and the corresponding family member based on the stored information. Also, the DB managing processor 140 may update the second user DB on the basis of the determined relationship information.

When the second user inputs speech into the speech inputter 10 provided in the vehicle 1, the speech processing apparatus recognizes the second user's speech and outputs an input language (324). The speech inputter 10 converts the input speech into a speech signal and transmits the speech signal to the speech processing apparatus 100, and the speech recognizer 110 of the speech processing apparatus 100 recognizes the speech signal and outputs a result of the recognition. The result of the recognition includes language spoken and input by the second user, i.e., spoken language. The spoken language is assumed to contain information on a relationship between the second user and another member.

The speech processor acquires the information on the relationship between the second user and the other member from the spoken language (325). For example, as in the example illustrated in FIG. 12, the second user may speak speech for making a call to her grandmother, and information indicating that the second user's grandmother is Katie may be provided from a dialogue between the second user and the speech processing apparatus 100. The speech processor 120 may acquire information indicating that the second user's grandmother is Katie on the basis of the spoken language.

The first user DB and the second user DB may be updated on the basis of the acquired relationship information (326). The DB managing processor 140 may store a relationship between the second user and Katie as "grandmother" in the second user DB. From the information indicating that the second user's grandmother is Katie, information indicating that the mother of the first user (James), who is the second user's father, is Katie may be acquired. Consequently, as illustrated in FIG. 14, the relationship between the first user and Katie may be saved as "mother" in the first user DB.

Although only the first user DB and the second user DB are mentioned in FIGS. 19 and 20 for convenience of description, the number of user DBs may vary depending on the number of family members who share a vehicle. Also, unlike the implementations described above, information on a name of another user or another family member may be acquired through a dialogue with a user, and a user DB may be updated by reflecting the acquired information in the user DB.

Also, although a case in which information stored in a user DB is a phone number has been described in the above implementations, information other than a phone number such as a home address may also be stored therein and managed.

In addition to a phone number, information such as a home address and birthday may be further stored in the user DB as additional information. The speech processing apparatus may use the additional information to provide information or a service that is required to a user or is predicted to be required to the user.

According to the speech processing apparatus, the vehicle having the speech processing apparatus, and the speech processing method according to an implementation described above, a relationship between a plurality of users may be determined on the basis of spoken content of the users, and more intelligent speech recognition may be performed on the basis of the determined relationship between the users or information required to the users may be provided proactively.

According to a speech processing apparatus, a vehicle having the speech processing apparatus, and a speech processing method according to an aspect, a relationship between a plurality of users can be determined on the basis of spoken language of the users, and more intelligent speech recognition can be performed on the basis of the determined relationship between the users or information required to the users can be provided proactively.

The above description is merely an illustrative description of the technical spirit of the present disclosure. One of ordinary skill in the art to which the present disclosure pertains should be able to make various modifications, changes, and substitutions within a scope that does not depart from essential features of the present disclosure. Consequently, the implementations disclosed herein and the accompanying drawings are for describing, not limiting, the technical spirit of the present disclosure, and the scope of the technical spirit is not limited by the implementations and the accompanying drawings. The scope of the technical spirit should be interpreted on the basis of the claims below, and all technical ideas included in a scope equivalent to the claims below should be interpreted as belonging to the scope of the present disclosure.

What is claimed is:

1. A speech processing apparatus comprising:
    a speech processor configured to:
        receive, from a microphone, a first spoken language of a first user,
        transmit, to a speaker, a signal about a feedback speech for the first spoken language, and
        acquire first information on a relationship between the first user and a second user based on a dialogue, between the first user and the speech processor, including the first spoken language and the feedback speech;
    a storage configured to store a first user database (DB) that includes personal information of the second user identified by a second identification tag set by the first user and a second user DB that includes personal information of the first user identified by a first identification tag set by the second user; and
    a DB managing processor configured to add the first information to the first identification tag and the second identification tag by adding a relationship of the second user to the first user to the second identification tag and adding a relationship of the first user to the second user to the first identification tag,
    wherein the speech processor is further configured to acquire second information between the second user and a third user based on a second spoken language of the second user,
    wherein the DB managing processor is further configured to:
        determine third information between the first user and the third user based on the second information, and
        update the first user DB based on the third information,
    wherein the first user DB further includes additional information that contains at least one of a birthday of the first user or an address of the first user, and
    wherein the DB managing processor updates the second user DB based on the additional information contained in the first user DB.

2. The speech processing apparatus of claim 1, wherein the personal information includes at least one of a phone number or an address.

3. The speech processing apparatus of claim 1, wherein the first identification tag includes a name of the first user, and
    wherein the second identification tag includes a name of the second user.

4. The speech processing apparatus of claim 1, wherein the personal information of the first user stored in the second user DB is able to be searched for by the relationship of the first user to the second user.

5. The speech processing apparatus of claim 1, wherein third user is a member of a group to which the first user and the second user belong.

6. The speech processing apparatus of claim 1, wherein the DB managing processor updates the second user DB based on the second information on the relationship between the second user and the third user.

7. The vehicle of claim 1, wherein the speaker outputs speech for providing a service to the second user on the basis of the additional information.

8. A vehicle comprising:
    a microphone;
    a speaker;
    a speech processor configured to:
        receive, from a microphone, a first spoken language of a first user,
        transmit, to a speaker, a signal about a feedback speech for the first spoken language, and
        acquire first information on a relationship between the first user and a second user based on a dialogue, between the first user and the speech processor, including the first spoken language and the feedback speech;
    a storage configured to store a first user database (DB) having personal information of the second user identified by a second identification tag which is set by the first user and a second user DB in which personal information of the first user identified by a first identification tag which is set by the second user; and
    a DB managing processor configured to add the first information to the first identification tag and the second identification tag by adding a relationship of the second user to the first user to the second identification tag and adding a relationship of the first user to the second user to the first identification tag,
    wherein the speech processor is further configured to acquire second information between the second user and a third user based on a second spoken language of the second user,
    wherein the DB managing processor is further configured to:
        determine third information between the first user and the third user based on the second information,
        update the first user DB based on the third information,
    wherein the first user DB further includes additional information that contains at least one of a birthday of the first user or an address of the first user, and
        wherein the DB managing processor updates the second user DB based on the additional information contained in the first user DB.

9. The vehicle of claim 8, wherein the personal information includes a phone number.

10. The vehicle of claim 9, wherein the first identification tag includes a name of the first user, and
    wherein the second identification tag includes a name of the second user.

11. The vehicle of claim 9, further comprising a communicator for communicating with mobile devices of the first user and the second user and downloading phone book data from the mobile devices,
    wherein the DB managing processor uses the downloaded phone book data to generate the first user DB and the second user DB.

12. The vehicle of claim 8, wherein the personal information of the first user stored in the second user DB is able to be searched for by the relationship of the first user to the second user.

13. A speech processing method comprising:
- storing a first user database (DB) that includes personal information of a second user identified by a second identification tag set by a first user and a second user DB that includes personal information of the first user identified by a first identification tag set by the second user, wherein the first user DB further includes additional information that contains at least one of a birthday of the first user or an address of the first user;
- receiving, from a microphone, a first spoken language of the first user and a second spoken language of the second user;
- transmitting, to a speaker, a signal about a feedback speech for the spoken language;
- acquiring first information on a relationship between the first user and the second user based on a dialogue, between the first user and the speech processor, including the first spoken language and the feedback speech;
- adding the first information on the relationship to the first identification tag and the second identification tag by adding a relationship of the second user to the first user to the second identification tag and adding a relationship of the first user to the second user to the first identification tag;
- acquiring second information between the second user and a third user based on the second spoken language of the second user;
- determining third information between the first user and the third user based on the second information;
- updating the first user DB based on the third information; and
- updating the second user DB based on the additional information contained in the first user DB.

14. The speech processing method of claim 13, wherein the personal information includes at least one of a phone number or an address.

15. The speech processing method of claim 13, wherein the first identification tag includes a name of the first user, and
wherein the second identification tag includes a name of the second user.

16. The speech processing method of claim 13, wherein the third user is a member of a group to which the first user and the second user belong.

17. The speech processing method of claim 13, further comprising updating the second user DB on the basis of the second information on the relationship between the second user and the other member.

* * * * *